US011096210B2

(12) United States Patent
Choi et al.

(10) Patent No.: US 11,096,210 B2
(45) Date of Patent: Aug. 17, 2021

(54) METHOD AND APPARATUS FOR TRANSMITTING DOWNLINK CONTROL CHANNEL INFORMATION IN CARRIER AGGREGATION SYSTEM

(71) Applicant: Samsung Electronics Co., Ltd., Suwon-si (KR)

(72) Inventors: Seung-Hoon Choi, Suwon-si (KR); Himke Van Der Velde, Staines (GB); Soeng-Hun Kim, Suwon-si (KR); Jae-Hyuk Jang, Suwon-si (KR); Young-Bum Kim, Seoul (KR); Tae-Han Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/582,450

(22) Filed: Sep. 25, 2019

(65) Prior Publication Data

US 2020/0029356 A1 Jan. 23, 2020

Related U.S. Application Data

(63) Continuation of application No. 15/010,138, filed on Jan. 29, 2016.
(Continued)

(51) Int. Cl.
*H04W 72/12* (2009.01)
*H04W 76/15* (2018.01)
(Continued)

(52) U.S. Cl.
CPC .......... *H04W 72/1289* (2013.01); *H04L 5/00* (2013.01); *H04W 76/15* (2018.02); *H04W 24/00* (2013.01)

(58) Field of Classification Search
CPC .......................... H04W 72/1289; H04W 76/15
See application file for complete search history.

(56) References Cited

U.S. PATENT DOCUMENTS

2012/0057527 A1 3/2012 Ou
2012/0320840 A1 12/2012 Kim et al.
(Continued)

FOREIGN PATENT DOCUMENTS

CA 2853238 A1 5/2013
CN 103796309 A 5/2014
(Continued)

OTHER PUBLICATIONS

Huawei et al. "Further consideration on cross-scheduling configuration", R2-106205, Nov. 9, 2010.
(Continued)

*Primary Examiner* — Hoon J Chung
(74) *Attorney, Agent, or Firm* — Jefferson IP Law, LLP

(57) ABSTRACT

A method for transmitting control information by a base station in a communication system using a plurality of serving cells comprises transmitting is provided. The method includes a terminal, an identifier of a second serving cell identifying where control information regarding a first serving cell is transmitted, transmitting, to the terminal, a predetermined value of a carrier identifier used in the second serving cell, and transmitting the control information regarding the first serving cell including the carrier identifier having the predetermined value through the second serving cell.

20 Claims, 15 Drawing Sheets

Related U.S. Application Data

(60) Provisional application No. 62/165,470, filed on May 22, 2015, provisional application No. 62/161,398, filed on May 14, 2015, provisional application No. 62/132,650, filed on Mar. 13, 2015, provisional application No. 62/109,333, filed on Jan. 29, 2015.

(51) Int. Cl.
  *H04L 5/00* (2006.01)
  *H04W 24/00* (2009.01)

(56) References Cited

U.S. PATENT DOCUMENTS

| | | | |
|---|---|---|---|
| 2013/0136006 | A1 | 5/2013 | Kim et al. |
| 2014/0094125 | A1 | 4/2014 | Behravan et al. |
| 2014/0133465 | A1 | 5/2014 | Johansson et al. |
| 2014/0185537 | A1 | 7/2014 | Papasakellariou |
| 2014/0228018 | A1 | 8/2014 | Zhang et al. |
| 2017/0041865 | A1 | 2/2017 | Takeda et al. |
| 2017/0063479 | A1 | 3/2017 | Kim et al. |
| 2017/0251461 | A1 | 8/2017 | Parkvall et al. |
| 2018/0027574 | A1 | 1/2018 | Lee et al. |
| 2018/0123769 | A1* | 5/2018 | Pelletier .......... H04L 5/001 |

FOREIGN PATENT DOCUMENTS

| | | |
|---|---|---|
| CN | 103875202 A | 6/2014 |
| KR | 10-2014-0088844 A | 7/2014 |
| KR | 10-2015-0113777 A | 10/2015 |
| WO | 2014003355 A1 | 1/2014 |
| WO | 2014070101 A1 | 5/2014 |

OTHER PUBLICATIONS

Discussion on mapping between CIF and Cell Index, 3GPP TSG-RAN WG2 Meeting #71bis, R2-105339, Oct. 11-15, 2010, Xi-an, China.

European Search Report dated Dec. 18, 2017 issued in European Application No. 16743733.4-1875.

European Office Action dated Sep. 7, 2018, issued in a counterpart European application No. 16743733.4-1219.

"Consideration on carrier aggregation beyond 5 carriers",XP050933789; R1-150581; Feb. 8, 2015.

"DL control signalling enhancements for LTE CA up to 32 component carriers",XP050934821; R1-151968; Apr. 19, 2015.

Chinese Office Action dated Nov. 27, 2019, issued in Chinese Patent Application No. 201680007733.5.

Indian Office Action dated Aug. 4, 2020, issued in Indian Application No. 201717029355.

'3rd Generation Partnership Project; Technical Spectification Group Radio Access Network; Evolved Universal Terrestrial Radio Access(E-UTRA); Physical layer procedures (Release 12)', F-06921, Jan. 7, 2015, pp. 1-225, XP050927573.

European Office Action dated Feb. 12, 2021, issued in European Application No. 16743733.4.

\* cited by examiner

METHOD AND APPARATUS FOR TRANSMITTING DOWNLINK CONTROL CHANNEL INFORMATION IN CARRIER AGGREGATION SYSTEM

CROSS-REFERENCE TO RELATED APPLICATION(S)

This application is a continuation application of prior application Ser. No. 15/010,138, filed on Jan. 29, 2016, which was based on and claimed the benefit under 35 U.S.C. § 119(e) of a U.S. Provisional application filed on Jan. 29, 2015 in the U.S. Patent and Trademark Office and assigned Ser. No. 62/109,333, a U.S. Provisional application filed on Mar. 13, 2015 in the U.S. Patent and Trademark Office and assigned Ser. No. 62/132,650, a U.S. Provisional application filed on May 14, 2015 in the U.S. Patent and Trademark Office and assigned Ser. No. 62/161,398, and a U.S. Provisional application filed on May 22, 2015 in the U.S. Patent and Trademark Office and assigned Ser. No. 62/165,470, the entire disclosure of each of which is hereby incorporated herein by reference.

TECHNICAL FIELD

The present disclosure relates to methods and apparatuses for transmitting downlink control signals by base stations to terminals and receiving the same by terminals in wireless communication systems.

BACKGROUND

Generally, mobile communication systems have been developed to guarantee user activity while providing voice services. Mobile communication systems have been expanding service areas from voice to data, and the systems have been grown to provide high-speed data services. However, more evolved mobile communication systems are required to live up to users' desire for higher-speed services and lacking resources that are faced by the current mobile communication systems.

As a system in development to respond to such demand, the 3rd generation partnership project (3GPP) long term evolution (LTE) is now underway for standardization as a next-generation communication system. LTE is the technology implementing high-speed packet-based communication with a transmission speed up to 100 Mbps. To that end, various approaches are being discussed, and some examples include simplifying the network architecture to reduce the number of nodes over a communication path and making radio protocols as close to radio channel as possible.

The LTE system adopts hybrid automatic repeat request (HARQ) scheme that re-transmits corresponding data through the physical layer when decoding fails at the initial stage of transmission. By the HARQ scheme, if the receiver fails to precisely decode data, the receiver transmits information indicating the decoding failure negative acknowledgement (NACK) to the transmitter so that the transmitter may re-transmit the corresponding data through the physical layer. The receiver raises the data reception capability by combining the data re-transmitted by the transmitter with the data for which decoding has failed. Further, when the receiver precisely decode data, the receiver may transmit information indicating decoding succeeds (acknowledgement (ACK) to the transmitter so that the transmitter may transmit new data.

FIG. 1 is a view illustrating a basic structure of time-frequency domain where data or a control signal is transmitted on downlink in an LTE system according to the related art.

In FIG. 1, the horizontal axis refers to the time domain, and the vertical axis refers to the frequency domain. In the time domain, the minimum transmission unit is an orthogonal frequency-division multiplexing (OFDM) symbol, and Nsymb OFDM symbols 102 come together to configure one slot 106, and two slots come together to configure one subframe 105. The slot is 0.5 ms long, and the subframe is 1.0 ms long. The radio frame 114 is a time domain unit consisting of ten subframes. In the frequency domain, the minimum transmission unit is subcarrier, and the bandwidth of the overall system transmission band consists of a total of $N_{BW}$ subcarriers 104.

The basic resource unit in the time-frequency domain is resource element 112 (RE), and this may be represented in OFDM symbol index and subcarrier index. Resource block 108 (RB) or physical resource block (PRB) is defined with Nsymb (102) continuous OFDM symbols in the time domain and $N_{RB}$ continuous subcarriers 110 in the frequency domain. Accordingly, one RB 108 includes Nsymb×NRB REs 112.

Generally, the minimum transmission unit of data is RB. Generally, in the LTE system, Nsymb=7, NRB=12, and, NBW and NRB are proportional to the bandwidth of system transmission band. Data rate is increased in proportion to the number of RBs scheduled for the terminal. The LTE system defines six transmission bandwidths. For the FDD system differentiating and operating downlink and uplink with frequencies, downlink transmission bandwidth may differ from uplink transmission bandwidth. The channel bandwidth refers to an RF bandwidth corresponding to the system transmission bandwidth.

Table 1 represents the correlation between system transmission bandwidth and channel bandwidth defined in the LTE system. For example, the LTE system having a 10 MHz channel bandwidth has a transmission bandwidth consisting of 50 RBs.

TABLE 1

| | Channel bandwidth $BW_{Channel}$ [MHz] | | | | | |
| --- | --- | --- | --- | --- | --- | --- |
| | 1.4 | 3 | 5 | 10 | 15 | 20 |
| Transmission bandwidth configuration $N_{RB}$ | 6 | 15 | 25 | 50 | 75 | 100 |

A downlink control signal is transmitted within first N OFDM symbols in the subframe. Generally, N={1, 2, 3}. Accordingly, N is varied depending on the amount of control signal to be transmitted in the current subframe. The control signal includes a control channel transmission period indicator indicating how many OFDM symbols the control signal is transmitted over, scheduling information on downlink data or uplink data, and HARQ ACK/NACK signal.

In the LTE system, the scheduling information on downlink data or uplink data is transferred through downlink control information (DCI) from the base station to the terminal. Uplink (UL) means radio link through which the terminal transmits data or control signal to the base station, and downlink (DL) means radio link through which the base station transmits data or control signal to the terminal. DCI defines various formats, and a defined DCI format applies and operates depending on whether scheduling information (UL (uplink) grant) for uplink data or scheduling information (DL (downlink) grant) for downlink data, whether the control signal is small-sized compact DCI, whether spatial multiplexing applies using multiple antennas, and whether DCI for power control or not. For example, DCI format 1 that is scheduling control signal (DL grant) for downlink data is configured to include at least the following control signals.

Resource assignment type 0/1 flag): notifies whether resource assignment type is type 0 or type 1. Type 0 allocates resources in resource block group (RBG) units by applying bitmap scheme. In the LTE system, the basic unit of scheduling is resource block (RB) represented in time and frequency domain resources, and RBG consists of a plurality of RBs and becomes the basic unit of scheduling in the type 0 scheme. Type 1 allows for assignment of a particular RB in the RBG.

Resource block assignment: notifies RB allocated for data transmission. Resource represented according to system bandwidth and resource assignment scheme is determined.

Modulation and coding scheme (MCS): notifies the size of transport block that is data to be transmitted and modulation scheme used for data transmission.

Hybrid automatic repeat request (HARQ) process number: notifies process number of HARQ.

New data indicator: notifies whether HARQ initial transmission or retransmission.

Redundancy version: notifies redundancy version of HARQ.

Transmit power control (TPC) command for physical uplink control channel (PUCCH): notifies transmit power control command for uplink control channel PUCCH.

The DCI undergoes channel coding and modulation and is transmitted through downlink physical control channel physical downlink control channel (PDCCH) or enhanced PDCCH (EPDCCH).

Generally, the DCI is subject to channel coding independently for each terminal and is then configured of independent PDCCH and transmitted. In the time domain, the PDCCH is transmitted during the control signal transmission period. The position of mapping of PDCCH in the frequency domain is determined by the identifier (ID) of each terminal and spread over the overall system transmission band.

The downlink data is transmitted through physical channel for downlink data transmission, physical downlink shared channel (PDSCH). PDSCH is transmitted after the control channel transmission period, and the specific mapping position in the frequency domain, modulation scheme, or other scheduling information are notified by the DCI transmitted through the PDCCH.

Through the MCS consisting of five bits among the control signals constituting the DCI, the base station notifies the terminal of the modulation scheme that has applied to the PDSCH to be transmitted and the size of data to be transmitted (transport block size; TBS). The TBS corresponds to the size before applying channel coding for error correction to the transport block (TB) to be transmitted by the base station.

The LTE system supports the following modulation schemes: quadrature phase shift keying (QPSK), 16 quadrature amplitude modulation (QAM), 64QAM, and their respective modulation orders (Qm) are 2, 4, and 6. That is, QPSK may transmit two bits per symbol, 16QAM four bits per symbol, and 64QAM six bits per symbol.

3rd generation partnership project (3GPP) LTE Rel-10 adopted bandwidth expanding technology to support more data traffic than LTE rel-8. The above technology which is called bandwidth extension or carrier aggregation (CA) may extend band to increase the volume of data transmitted as much as the band extended as compared with LTE rel-8 terminal transmitting data within a single band. Each of the bands is called component carrier (CC), and LTE rel-8 terminal has been specified to have one component carrier for each of downlink and uplink. Further, downlink component carrier and uplink component carrier connected thereto via SIB-2 are collectively called cell. The SIB-2 connection between the downlink component carrier and the uplink component carrier is transmitted through a terminal-dedicated signal. CA-supporting terminal may receive downlink data through multiple serving cells and transmit uplink data.

In Rel-10, when the base station has difficulty sending physical downlink control channel (PDCCH) in a particular serving cell to a particular terminal, a carrier indicator field (CIF) may be configured as a field to indicate that PDCCH is transmitted through other serving cell and the corresponding PDCCH indicates the physical downlink shared channel (PDSCH) or physical uplink shared channel (PUSCH) of other serving cell. The CIF may be configured in CA-supporting terminal. The CIF has been set to be able to indicate other serving cell by adding three bits to the PDCCH information in the particular serving cell, and the CIF is included only upon cross carrier scheduling, and when CIF is not included, cross-carrier scheduling is not performed. When CIF is present in downlink assignment information (DL assignment), the CIF indicates the serving cell where the PDSCH scheduled by DL assignment information is to be transmitted, and when the CIF is present in uplink resource assignment information (UL grant), the CIF indicates the serving cell where the PUSCH scheduled by the UL assignment information grant is to be transmitted.

As set forth above, in LTE-10, bandwidth extension technique, carrier aggregation (CA), has been defined to allow multiple serving cells to be configured in the terminal. The base station transmits downlink control information for the multiple serving cells to the terminal for data scheduling.

Meanwhile, LTE-13 assumes scenarios in which up to 32 serving cells are configured, and now being discussed is the concept of expanding the number of serving cells up to 32 using unlicensed bands. When the number of serving cells assigned to the terminal exceeds five, the existing three-bit CIF may be expanded in size to increase the size of the PDCCH information. In this case, the terminal's receiving operation would be different from existing ones, and thus, the existing three-bit CIF needs to be maintained.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the disclosure is to provide methods and apparatuses for permitting cross-carrier scheduling when transmitting downlink control signals to multiple cells while maintaining the three-bit carrier indicator field (CIF) in wireless communication systems supporting carrier aggregation.

The first disclosure provides methods and apparatuses for transmitting aperiodic channel information for multiple cells by maintaining the three-bit CIF in the wireless communication system supportive of carrier aggregation.

An embodiment of the first disclosure provides a cross-carrier scheduling method and apparatus in a wireless communication system.

An embodiment of the first disclosure provides a method and apparatus for keeping the size of a cross carrier indicator to have a predetermined number of bits in a wireless communication system.

An embodiment of the first disclosure provides a method and apparatus for providing information between a cross carrier indicator and a cell identifier to a terminal in a wireless communication system.

An embodiment of the first disclosure provides a method and apparatus for grouping a plurality of cells in a wireless communication system.

The second disclosure provides a method and apparatus for communicating a measurement result by a terminal in a wireless communication system.

The second disclosure provides a method and apparatus for selecting a measurement result in different methods depending on the type of a control message including a measurement result by a terminal in a wireless communication system.

The second disclosure provides a method and apparatus for selecting a measurement result by a terminal depending on whether a control message is a measurement reporting message or a secondary cell group (SCG) failure message in a wireless communication system.

The third disclosure provides a method and apparatus for transmitting an intra-device coexistence message by a terminal in a wireless communication system.

The third disclosure provides a method and apparatus for preventing positioning signal interference in a wireless communication system.

The third disclosure provides a method and apparatus for transmitting information regarding uplink transmission affecting positioning signals related to emergency calls in a wireless communication system.

In accordance with an aspect of the present disclosure, a method for transmitting control information by a base station in a communication system using a plurality of serving cells is provided. The method includes transmitting, to a terminal, an identifier of a second serving cell identifying where control information regarding a first serving cell is transmitted, transmitting, to the terminal, a predetermined value of a carrier identifier used in the second serving cell, and transmitting the control information regarding the first serving cell including the carrier identifier having the predetermined value through the second serving cell.

In accordance with an aspect of the present disclosure, a base station for transmitting control information in a communication system is provided. The base station using a plurality of serving cells includes a controller configured to generate an identifier of a second serving cell identifying where control information regarding a first serving cell is transmitted and a predetermined value of a carrier identifier used in the second serving cell, and generate the control information regarding the first serving cell including the carrier identifier having the predetermined value, and a transmitter configured to transmit the identifier of the second serving cell, the predetermined value of the carrier identifier, and the control information regarding the first serving cell to a terminal through the second serving cell.

In accordance with an aspect of the present disclosure, a method for transmitting a measurement result by a terminal in a wireless communication system is provided. The method, when control information including measurement results of one or more neighbor cells is to be transmitted, determining whether the control information is a measurement result reporting message or a SCG failure message, when the control information is the SCG failure message, selecting a best measurement result of measurement results of serving frequencies for SCG serving cells and serving frequencies configured in the terminal and selecting a predetermined number of best measurement results of measurement results of all non-serving frequencies configured in the terminal, generating the SCG failure message including the selected measurement results, and transmitting the generated SCG failure message to a base station.

In accordance with an aspect of the present disclosure, a terminal for transmitting a measurement result in a wireless communication system is provided. The terminal includes a controller configured to, when control information including measurement results of one or more neighbor cells is to be transmitted, determine whether the control information is a measurement result reporting message or a SCG failure message, and when the control information is the SCG failure message, select a best measurement result of measurement results of serving frequencies for SCG serving cells and serving frequencies configured in the terminal, and select a predetermined number of best measurement results of measurement results of all non-serving frequencies configured in the terminal, a control message processor configured to generate the SCG failure message including the selected measurement results, and a transceiver transmitting the generated SCG failure message to a base station.

In accordance with an aspect of the present disclosure, a method for transmitting control information by a terminal in a wireless communication system is provided. The method includes detecting interference with a positioning signal received by the terminal or detecting interference with a positioning signal to be received by the terminal, determining whether the positioning signal is related to an emergency call, when the positioning signal is not related to the emergency call, determining whether transmission of an IDC message is configured in the terminal, when the transmission of the IDC message is configured in the terminal, and the IDC message may be transmitted, generating an IDC message including first information related to the interference with the positioning signal, and transmitting the generated IDC message to a base station.

In accordance with an aspect of the present disclosure, a terminal for transmitting control information in a wireless communication system is provided. The terminal includes a controller configured to detect interference with a positioning signal received by the terminal or detecting interference with a positioning signal to be received by the terminal, determine whether the positioning signal is related to an emergency call, when the positioning signal is not related to the emergency call, determine whether transmission of an IDC message is configured in the terminal, and when the transmission of the IDC message is configured in the terminal, and the IDC message may be transmitted, generate an IDC message including first information related to the interference with the positioning signal, and a transceiver configured to transmit the generated IDC message to a base station.

Other aspects, advantages, and salient features of the disclosure will become apparent to those skilled in the art from the following detailed description, which, taken in

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
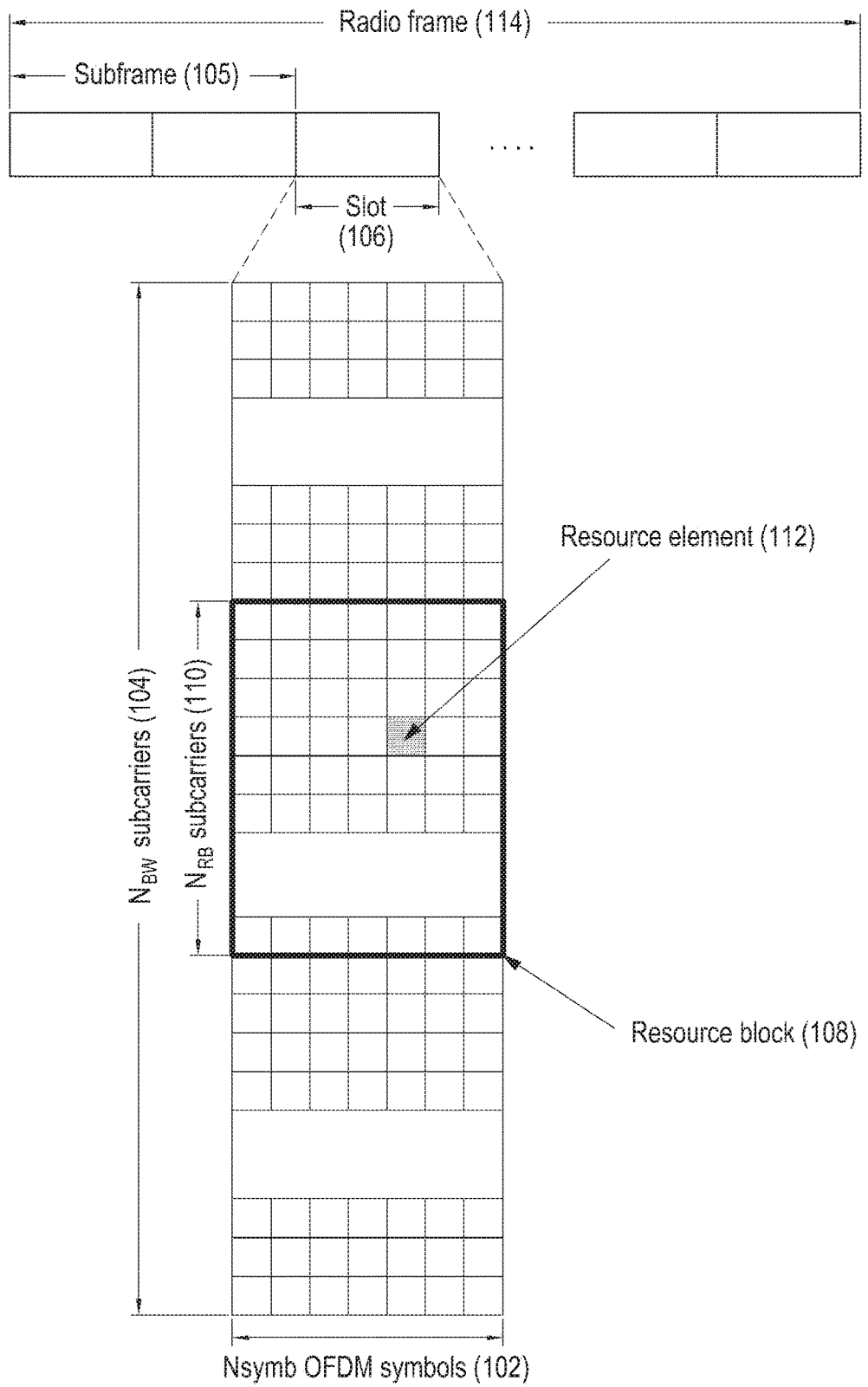
FIG. 1 is a view illustrating a basic structure of time-frequency domain which is radio resource domain where data or a control signal is transmitted on downlink in a long term evolution (LTE) system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "terminal" may be interchangeably used with the term "user equipment (UE)," and the term "base station" may be interchangeably used with the term "eNode-B" or "eNB."

The description of embodiments of the present disclosure primarily targets advanced evolved universal terrestrial radio access (E-UTRA) (or LTE-advanced (LTE-A)) supporting carrier aggregation but the subject matter of the present disclosure may also be applicable to other communication systems with a similar technical background with minor changes without significantly departing from the scope of the present disclosure, and this may be possible under the determination of those skilled in the art to which the present disclosure pertains. For example, the present disclosure may be applicable to multicarrier high speed packet access (HSPA) supporting carrier aggregation.

Considering that the number of licensed bands, such as LTE (unless stated otherwise herein, this term is used to collectively refer to LTE-A or other advanced versions of LTE) frequency, is limited, it is being researched to provide LTE services on an unlicensed band such as 5 GHz band, and this is called licensed assisted access (LAA). In adopting the LAA, it is considered to operate the LTE cell, which is of a licensed band, as a P cell and the LAA cell, which is of an unlicensed band, as an S cell by applying the carrier aggregation technique of LTE-A. Accordingly, like in LTE-A, feedbacks generated in the LAA cell that is an S Cell should be transmitted only from the P cell, and the FDD and TDD all may apply to the LAA cell. Now described is a communication system in which LTE cells and LAA cells co-exist and are combined through carrier aggregation.

Meanwhile, in the following detailed description, transmission of a particular signal through a channel may be represented as transmission of the channel for ease of description. For example, the term "control channel is transmitted" may mean that predetermined information is transmitted through the control channel. As another example, the term "PDSCH is transmitted" may mean that predetermined information is transmitted through the PDSCH. As another example, the term "PDSCH is transmitted through a serving cell" may mean that the PDSCH through which predetermined information is transmitted uses a serving cell frequency band. Hereinafter, the terms may be interchangeably used. This is why the above-described terms or phrases are often used in the relevant field to which the present disclosure pertains.

First Disclosure

Figure 2A:
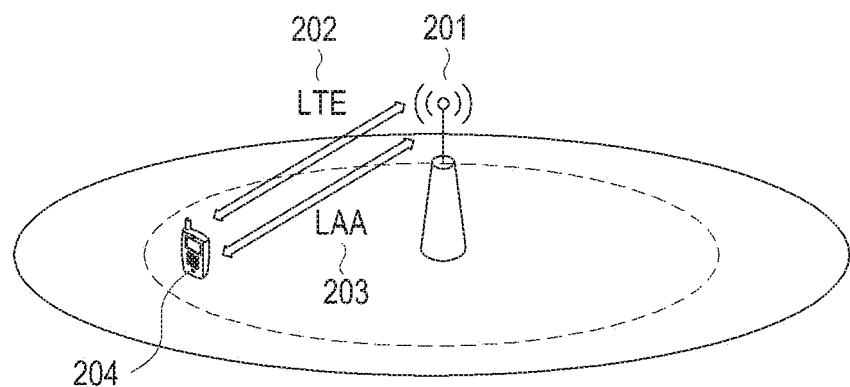
FIGS. 2A and 2B are views illustrating communication systems according to various embodiments of the present disclosure.
Figure 2B:
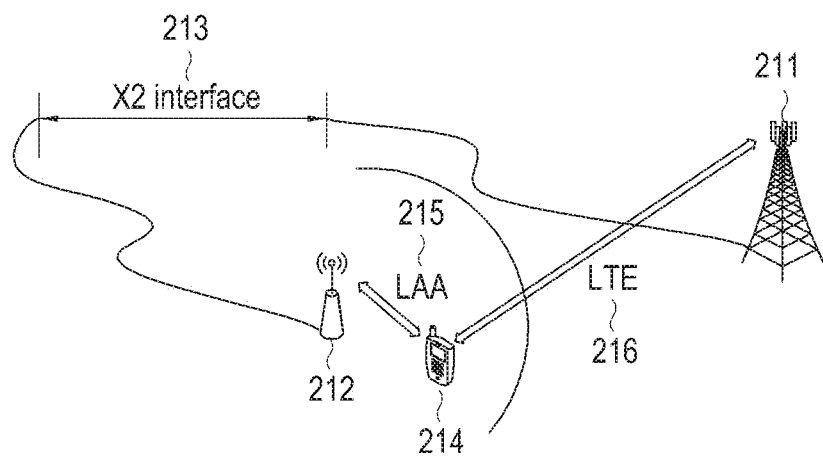

FIGS. 2A and 2B are views illustrating communication systems according to various embodiments of the present disclosure.

Referring to FIGS. 2A and 2B, FIG. 2A illustrates an example in which an LTE cell 202 and an LAA cell 203 co-exist in one small base station 201 over the network and the UE 204 communicates data with the base station through the LTE cell 202 and the LAA cell 203. In this case, there is no limitation on the duplex scheme of the LTE cell 202 or LAA cell 203. However, uplink transmission is performed only through the LTE cell 202 when the LTE cell is a PCell.

FIG. 2B illustrates an example in which there are installed an LTE macro base station 211 for broader coverage via LTE communication 216 and an LAA small base station 212 for increased data transmission over the network via LAA communication 215, and in this case, there is no limitation on the duplex scheme of the LTE macro base station 211 or the LAA small base station 212. However, uplink transmission from UE 214 is performed only through the LTE base station 211 when the LTE base station is a PCell. At this time, the LTE base station 211 and the LAA base station 212 are assumed to have an ideal backhaul network. Accordingly, even when X2 communication 213 is possible between the base stations, so that uplink transmission is performed only through the LTE base station 211, the LAA base station 212 may receive relevant control signal from the LTE base station 211 in real-time via the X2 communication 213. In the system shown in FIGS. 2A and 2B, the LTE cell and LAA cell may have a plurality of serving cells and together may support up to 32 serving cells. Accordingly, the schemes proposed according to the first disclosure may apply to both the system of FIG. 2B and the system of FIG. 2A.

Figure 3:
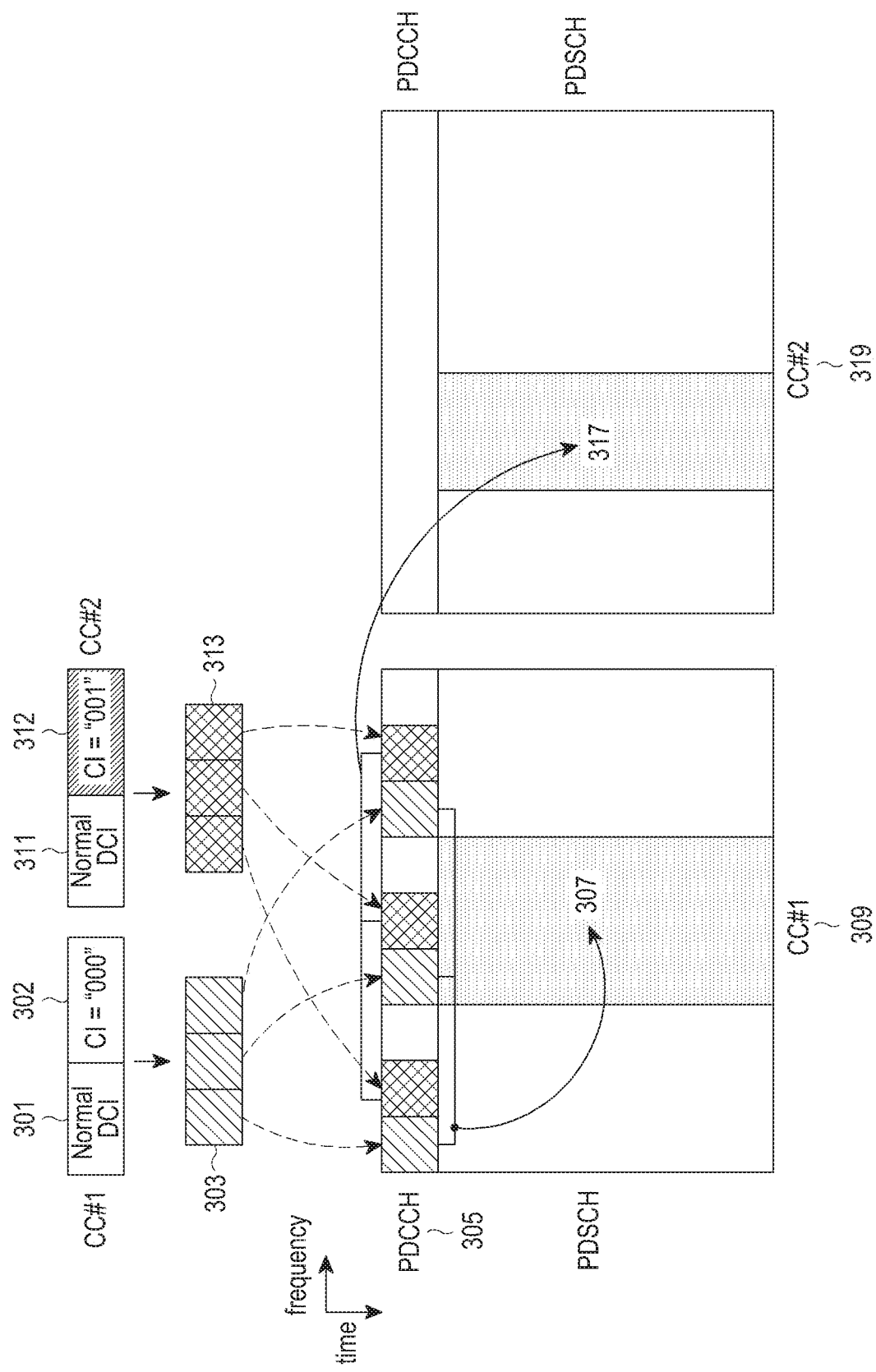
FIG. 3 is a view illustrating a cross-carrier scheduling scheme according to an embodiment of the present disclosure.

FIG. 3 is a view illustrating a cross-carrier scheduling scheme according to an embodiment of the present disclosure.

Referring to FIG. 3 exemplifies a scheduling operation for an LTE-A terminal where component carrier #1 (CC #1, 309) and component carrier #2 (DL CC #2, 319) are aggregated.

The example shown in FIG. 3 assumes that CC #2 319 is relatively excessively larger in downlink interference than CC #1 309, and thus the base station has difficulty meeting a predetermined DCI reception capability when transmitting DCI for data transmission of CC #2 319 to the terminal through CC #2 319. In such case, the base station may transmit DCI through CC #1 309, and the terminal should be previously aware that the DCI informing the scheduling information of data transmitted through CC #2 319 is lowered in CC #1 309.

Data may be error-corrected through HARQ retransmission, and thus, no trouble would occur when the base station transmits data via CC #2 319 to the terminal. However, the base station adds a carrier indicator (CI) indicating which component carrier of scheduling information the DCI indicates to the DCI indicating the resource assignment information on the scheduled data and transmission format and transmits the same. For example, CI='000' denotes scheduling information for CC #1 309, and CI='001' denotes scheduling information for CC #2 319.

Accordingly, the base station combines the DCI 301 indicating the resource assignment information and transmission format of the data 307 scheduled for CC #1 with the carrier indicator 302 to configure an extended DCI. Then, the base station performs channel coding on the same (303), and then configures PDCCH through modulation and interleaving, and then maps to the PDCCH region 305 of CC #1, then transmits the same. Accordingly, the base station combines the DCI 311 indicating the resource assignment information and transmission format of the data 317 scheduled for CC #2 with the carrier indicator 312 to configure an extended DCI. Then, the base station performs channel coding on the same (313), then configures PDCCH through modulation and interleaving, then maps to the PDCCH region 305 of CC #1, and then transmits the same.

In FIG. 3, the PDSCH in CC #2 may be scheduled through cross-carrier scheduling from CC #1, or the PDSCH in CC #2 may be scheduled through self-scheduling from CC #2. When the PDSCH on CC #2 is scheduled through cross-carrier scheduling from CC #1, the terminal may be set by a higher layer signal to monitor the PDCCH/EPDCCH for scheduling the PDSCH transmitted on CC #2 in a blind decoding scheme on CC #1. When the PDSCH on CC #2 is scheduled through self-carrier scheduling from CC #2, the terminal may be set by a higher layer signal to monitor the PDCCH/EPDCCH for scheduling the PDSCH transmitted on CC #2 in a blind decoding scheme on CC #2.

Figure 4:
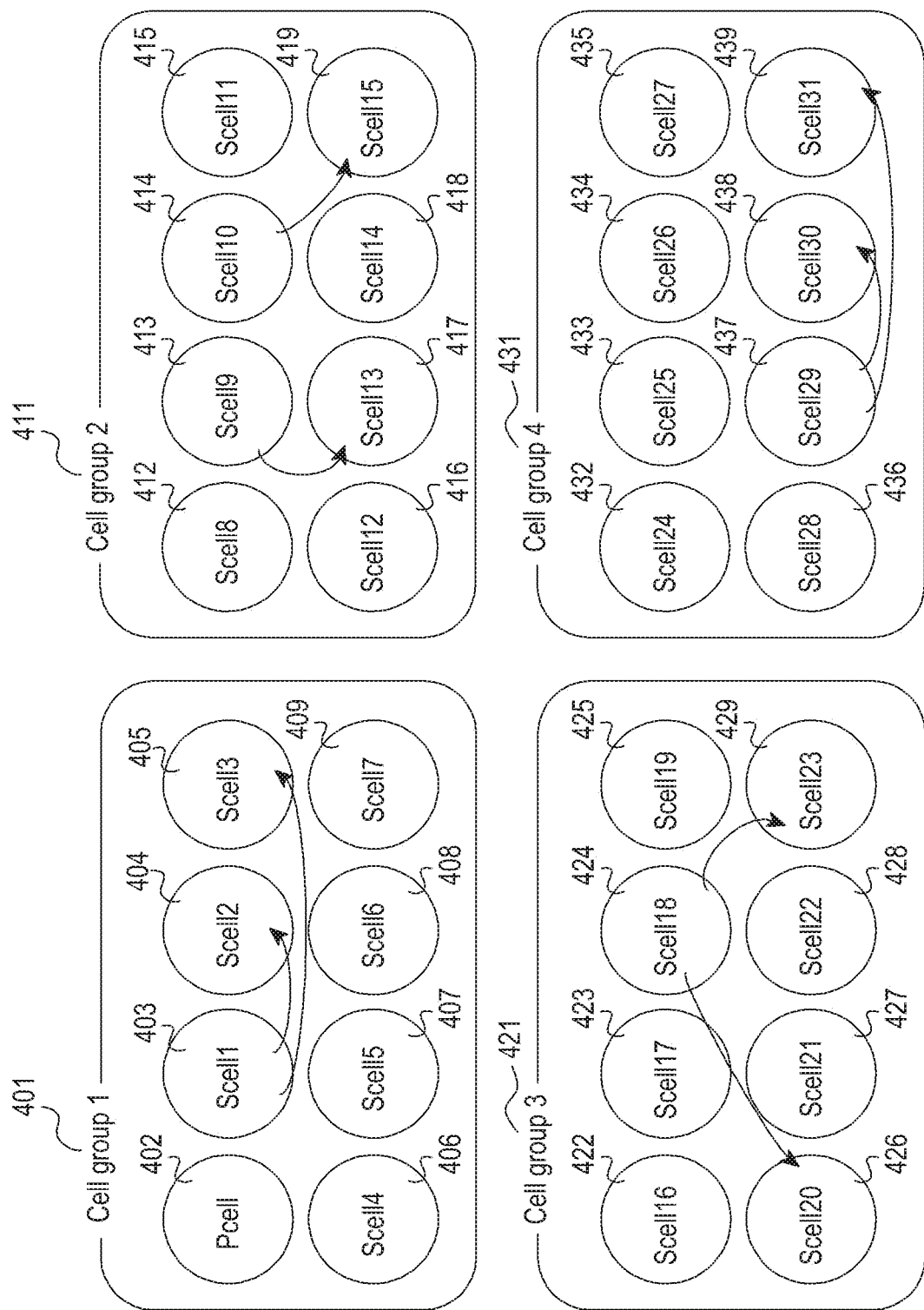
FIG. 4 is a view illustrating a scheme of grouping and cross-carrier scheduling cells according to an embodiment of the present disclosure.

Next, described with reference to FIG. 4 is a scheme for explicitly grouping serving cells to maintain the size of carrier indicator field (CIF) bit field according to a first embodiment of the first disclosure.

FIG. 4 is a view illustrating an example of transmitting downlink control information including a carrier indicator by explicitly grouping serving cells and performing cross-carrier scheduling according to an embodiment of the present disclosure.

As seen in FIG. 4, Cell group 1 401 includes Pcell 402, Scell 1 403, Scell 2 404, Scell 3 405, Scell 4 406, Scell 5 407, Scell 6 408, Scell 7 409. Cell group 2 411 includes Scell 8 412, Scell 9 413, Scell 10 414, Scell 11 415, Scell 12 416, Scell 13 417, Scell 14 418, and Scell 15 419. Cell group 16 421 includes Scell 16 422, Scell 17 423, Scell 18 424, Scell 19 425, Scell 20 426, Scell 21 427, Scell 22 428, and Scell 23 429. Cell group 4 431 includes Scell 24 432, Scell 25 433, Scell 26 434, Scell 27 435, Scell 28 436, Scell 29 437, Scell 30 438, and Scell 31 439.

The base station may configure carrier aggregation for the terminal by configuring multiple cells through higher layer signal. The cell configuration information for configuring cells in the terminal may include serving cell index information indicating the number of the serving cell. When the number of cells configured in the terminal through the higher layer signal is five or less, the cell index information of serving cell may be mapped to CIF information as it is. For example, the serving cell index (ServCellIndex) value, 2, may be mapped to the CIF value, 2. Accordingly, the base station, when transmitting downlink control channel (E)PDCCH) through other serving cell for scheduling on the PDSCH/PUSCH transmitted in one serving cell, may instruct the terminal using the three bits of the CIF mapped to the cell index information. When the number of cells is five or less, which serving cell of data transmission the scheduling is for may be clearly known to the terminal even using the CIF alone.

However, when the number of cells exceeds five, a scheme as described with respect to the first embodiment is needed to keep the three bits of CIF.

When the number of cells configured in the terminal is more than five, the base station may group the cells by performing grouping on each serving cell. The grouping information may be configured and transmitted to the terminal by a higher layer signal, and each serving cell is included in only one group. Cell grouping may come into two schemes. First, cell grouping may come into a scheme where a particular cell in the cell group is configured by a higher layer signal to perform physical uplink control channel (PUCCH) transmission, and the PUCCH including the uplink control signals for the cells in a cell group is transmitted through the particular cell. Second, cell grouping may be performed in such a manner that cells are grouped to support cross-carrier scheduling only among the cells in the cell group in order to perform cross-carrier scheduling through transmission of the (E)PDCCH. The above two cell grouping schemes may be independent from each other, at least one of the cell grouping schemes may be set by a higher layer signal, and the cell grouping as set may be configured and transmitted to the terminal by a higher layer signal. In the following embodiments, the second cell grouping scheme is assumed for the purpose of description.

When the number of cells configured in the terminal is more than five and not more than eight, although the serving cells belong to different groups, like in the case where the number of cells is five or less, the base station may inform the terminal that the scheduling information is for the one serving cell using the CIF three bits mapped to the cell index information when transmitting downlink control channel (E)PDCCH of other serving cell for scheduling on physical downlink shared channel (PDSCH)/physical uplink shared channel (PUSCH) transmitted in one serving cell.

On the other hand, when the number of cells configured in the terminal is more than eight, the serving cell index of the serving cells included in each cell group cannot be mapped to the CIF in one-to-one correspondence. This is why if the CIF is fixed to three bits, it may indicate only eight serving cells, but the number of all the cells exceeds eight. Accordingly, information as to which CIF the serving cells belonging to each group or serving cell index is mapped to is required, and the "mapping information of the CIF and the serving cell indexes of the serving cells in the cell group" may be configured by higher layer information and may be transmitted to the terminal. When the number of cells configured in the terminal exceeds five, this method may also apply. Or, even when the number of cells configured for the terminal capable of aggregating more than five or eight cells does not exceed five, the mapping information of the CIF and the serving cell indexes of the serving cells in the cell group may be transmitted by the higher layer signal to the terminal according to such scheme.

The following Table 2 shows an example of the mapping information of the CIF and the serving cell indexes of the serving cells in the cell group.

TABLE 2

S cell 1 with serving cell index 1 in group 1 is CIF 1
S cell 2 with serving cell index 2 in group 1 is CIF 2
S cell 3 with serving cell index 3 in group 1 is CIF 3
S cell 4 with serving cell index 4 in group 1 is CIF 4
S cell 5 with serving cell index 5 in group 1 is CIF 0
S cell 6 with serving cell index 6 in group 1 is CIF 5
S cell 7 with serving cell index 7 in group 1 is CIF 6
P cell with serving cell index 0 in group 1 is CIF 7
S cell 8 with serving cell index 8 in group 2 is CIF 1
S cell 9 with serving cell index 9 in group 2 is CIF 2
S cell 10 with serving cell index 10 in group 2 is CIF 3
S cell 11 with serving cell index 11 in group 2 is CIF 4
S cell 12 with serving cell index 12 in group 2 is CIF 5
S cell 13 with serving cell index 13 in group 2 is CIF 6
S cell 14 with serving cell index 14 in group 2 is CIF 7
S cell 15 with serving cell index 15 in group 2 is CIF 0

TABLE 2-continued

S cell 16 with serving cell index 16 in group 3 is CIF 0
S cell 17 with serving cell index 17 in group 3 is CIF 1
S cell 18 with serving cell index 18 in group 3 is CIF 2
S cell 19 with serving cell index 19 in group 3 is CIF 3
S cell 20 with serving cell index 20 in group 3 is CIF 4
S cell 21 with serving cell index 21 in group 3 is CIF 5
S cell 22 with serving cell index 22 in group 3 is CIF 6
S cell 23 with serving cell index 23 in group 3 is CIF 7
S cell 24 with serving cell index 24 in group 4 is CIF 4
S cell 25 with serving cell index 25 in group 4 is CIF 3
S cell 26 with serving cell index 26 in group 4 is CIF 2
S cell 27 with serving cell index 27 in group 4 is CIF 1
S cell 28 with serving cell index 28 in group 4 is CIF 0
S cell 29 with serving cell index 29 in group 4 is CIF 5
S cell 30 with serving cell index 30 in group 4 is CIF 6
S cell 31 with serving cell index 31 in group 4 is CIF 7

Although in the above embodiment the cell group is a single one by grouping one "scheduling (serving) cell" transmitting the (E)PDCCH and multiple "scheduled (serving) cells" transmitting the PDSCH/PUSCH scheduled by the scheduling cell, it may also be possible to group into a single group multiple scheduling cells transmitting the (E)PDCCH and multiple scheduled serving cells transmitting the PDSCH/PUSCH scheduled by the multiple scheduling cells.

Meanwhile, the "mapping information of the CIF and the serving cell indexes of the serving cells in the cell group" as in the example shown in Table 2 may be known to the terminal using a predetermined equation. When the number of cells configured for the terminal exceeds five, or even when the number of cells configured for the terminal capable of aggregating more than five or eight cells does not exceed five, the equation may apply.

An example of the equation is as in Equation 1.

$$CIF = k \bmod M \quad \text{Equation 1}$$

Here, k is the serving cell index, and M is the number of serving cells included in the cell group. M may be, e.g., five or eight.

As an example of applying Equation 1, when the number of serving cells in cell group 4 is 8 (M=8), if Equation 1 applies to Scell 27 with the serving cell index 27 (k=27), CIF=27 mod 8=3. That is, the CIF value of the 27th cell in cell group 4 is 3.

As another example of configuring a CIF value, the CIF value may be determined in the ascending order of the serving cell indexes of the serving cells scheduled in each scheduling serving cell. When the serving cell indexes of the scheduling cells are 1, 9, and 17, and the serving cell indexes of the serving cells scheduled by the scheduling serving cells are as shown in Table 3, each serving cell index and CIF value are mapped as shown in Table 3.

TABLE 3

|  | CIF assigned | | | | | | | |
| --- | --- | --- | --- | --- | --- | --- | --- | --- |
| Scheduling cell index | 0 | 1 | 2 | 3 | 4 | 5 | 6 | 7 |
| Scheduling cell with serving index 1 | 2 | 5 | 10 | 11 | 13 | 15 | 18 | 20 |
| Scheduling cell with serving cell index 9 | 3 | 4 | 6 | 8 | 12 | 14 | 16 | 19 |
| Scheduling cell with serving cell index 17 | 7 | 9 | 17 | 21 | 22 | 23 | 24 | 25 |

The vertical axis in Table 3 above shows the cell indexes of the scheduling serving cells which are respectively 1, 9, and 17. The horizontal axis is the CIF value, and the shade area indicates the cell indexes of the serving cells scheduled. Assuming the serving cells are configured for the terminal in the order of cell indexes 2, 3, 4, 5, 6, 7, 8, 10, 11, 12, 13, 14 . . . of the scheduled serving cells, the CIF value is assigned depending on what number the scheduled serving cell is scheduled by the scheduling serving cell.

In Table 3, for example, although the fourth serving cell is indeed configured third for the terminal, it is assigned CIF 1 because it is scheduled second in the ninth serving cell that is the scheduling serving cell. As another example, although the 13th serving cell is indeed configured eleventh for the terminal, it is assigned CIF 4 because it is scheduled fifth in the first serving cell that is the scheduling serving cell.

When several scheduled serving cells are configured for the terminal to be simultaneously scheduled by one scheduling cell, the CIF values are assigned in ascending order of serving cell indexes, and the terminal determines the serving cell transmitting data through the CIF values. Here, when the configuration of a particular serving cell is released and is removed from the cells configured for the terminal, the CIF values may be reconfigured in the ascending order of cell indexes except the removed cell. For example, when among serving cells 2, 5, 10, 11, 13, 15, 18, and 20 scheduled in the scheduling cell with a serving cell index of 1, the 11th and 13th serving cells are removed from the configuration, and the CIFs of serving cells 2, 5, 10, 15, 18, and 20 may be reconfigured to 0, 1, 2, 3, 4, and 5, respectively. Accordingly, when a scheduled cell is added to the scheduling cell with a serving cell index of 1, CIF values 7 and 8 are assigned to the added cell, and the terminal receives data on the added serving cell according to the CIF values.

In another approach, when the configuration of a particular serving cell is released and the cell is removed from the cells configured for the terminal, the CIF values may maintain their CIF configuration regardless of the removed cell. For example, when among serving cells 2, 5, 10, 11, 13, 15, 18, and 20 scheduled in the scheduling cell with a serving cell index of 1, the 11th and 13th-indexed serving cells are removed from the configuration, and the CIF values of serving cells 2, 5, 10, 15, 18, and 20 may be left with their respective original values 0, 1, 2, 5, 6, and 7. Accordingly, when a scheduled serving cell is added to the scheduling cell with a serving cell index of 1, CIF value 3 or 4 which is assigned to no cell are assigned to the added cell, and the terminal receives data on the added serving cell according to the CIF value 3 or 4 newly assigned.

The serving cells in each group may be mapped to CIFs in a one-to-one correspondence by the above-described schemes, and the base station may set serving cells where downlink control channel should be received to the terminal by a higher layer signal and may perform cross-carrier scheduling on the cells in the same group by transmitting the downlink control channel.

For example, as shown in FIG. 4, when the base station transmits scheduling information through cross-carrier scheduling in cell group 1 401, the information indicating that the scheduling information for serving cell 2 404 and serving cell 3 405 is transmitted on serving cell 1 403 is previously known to the terminal through higher layer information, and the terminal attempts to receive the scheduling information for serving cell 2 404 and serving cell 3 405 in serving cell 1 403.

Now described is a scheme for maintaining the size of the CIF bit field as three bits by implicitly grouping serving cells according to a second embodiment of the first disclosure.

The scheme according to the second embodiment of the first disclosure is described with respect to FIG. 4.

The second embodiment is for the base station to implicitly group serving cells. Although the base station transmits cell grouping information to the terminal using higher layer information in the first embodiment of the present disclosure, cell grouping is implicitly performed in the second embodiment of the present disclosure, and thus, the grouping information need not be transmitted to the terminal. In the second embodiment of the present disclosure, the serving cells belong to one group, and the base station may determine whether to group the serving cells. Accordingly, the base station need not transmit grouping information to the terminal. However, also in the second embodiment of the present disclosure, the base station may transmit grouping information to the terminal in some cases.

When the number of cells configured in the terminal is five or less, the cell index information of serving cell may be mapped to CIF information as it is. When the number of cells configured in the terminal is more than five and not more than eight, although the serving cells belong to different groups, like in the case where the number of cells is five or less, the base station may inform the terminal that the scheduling information is for the one serving cell using the CIF three bits mapped to the cell index information when transmitting downlink control channel (E)PDCCH) of other serving cell for scheduling on PDSCH/PUSCH transmitted in one serving cell.

Meanwhile, when the number of cells configured in the terminal is more than eight, the serving cell index of the serving cells included in each cell group cannot be mapped to the CIF in one-to-one correspondence. This is why if the CIF is fixed to three bits, it may indicate only eight serving cells, but the number of all the cells exceeds eight. Accordingly, information as to which CIF the serving cells belonging to each group or serving cell index is mapped to is needed, and such information may be configured as higher layer information and may be transmitted to the terminal. When the number of cells configured in the terminal exceeds five, this method may also apply. Even when the number of cells configured for the terminal capable of aggregating more than five or eight cells does not exceed five, the method may apply.

In a first scheme according to the second embodiment, the base station may also transmit the CIF value when transmitting the higher layer information on cross-carrier scheduling in the serving cell where the PDSCH is transmitted.

For example, in 3GPP Rel-10, the higher layer information for cross-carrier scheduling on the serving cell where the PDSCH is transmitted is as shown in Table 4.

TABLE 4

```
CrossCarrierSchedulingConfig-r10 ::=   SEQUENCE {
    schedulingCellInfo-r10             CHOICE {
        own-r10                        SEQUENCE {     -- No cross
carrier scheduling
            cif-Presence-r10               BOOLEAN
        },
        other-r10                      SEQUENCE {    -- Cross
carrier scheduling
            schedulingCellID-r10           ServCellIndex-r10,
            pdsch-Start-r10                INTEGER    (1..4)
        }
    }
}
```

Meanwhile, in Table 4, information for cross-carrier scheduling is as shown in Table 5.

TABLE 5

| other-r10 schedulingCellID-r10 pdsch-Start-r10 | SEQUENCE { -- Cross carrier scheduling ServCellIndex-r10, INTEGER (1..4) } |
|---|---|

For 3GPP Rel-13 supporting the CA of up to 32 cells, schedulingCellID-r13 indicating the cell index where the (E)PDCCH is transmitted is included instead of "schedulingCellID-r10" in Table 5 for Rel-10. Meanwhile, "ServCellIndex-r13" may be set to one of (0 . . . 31). Meanwhile, when the (E)PDCCH is transmitted in the serving cell of "schedulingCellID-r13" having one value of (0 . . . 31), the CIF value (cif_value) indicating the serving cell where the PDSCH is transmitted may be set to one value of (0 . . . 7).

That is, in the second embodiment of the first disclosure, the higher layer information for cross-carrier scheduling for Rel-13 may be configured as shown in Table 6.

TABLE 6

| other-r13 schedulingCellID-r13 cif_value-r13 pdsch-Start-r13 | SEQUENCE { -- Cross carrier scheduling ServCellIndex-r13, INTEGER (0..7) INTEGER (1..4) } |
|---|---|

As described above, as the base station transmits the higher layer information on cross-carrier scheduling to the terminal, the terminal may be aware that the (E)PDCCH where the scheduling information of the PDSCH of the serving cell is transmitted is transmitted in the serving cell having the value of "schedulingCellID-r13." Further, as the CIF value of the (E)PDCCH is set to "cif-value-r13," the terminal may be aware that the (E)PDCCH is the (E)PDCCH scheduling the PDSCH transmitted in the serving cell.

Here, the base station may internally, implicitly or explicitly configure a serving cell group as shown in FIG. 4. When the number of serving cells of one serving cell group in a configured serving cell group is eight, the number of serving cells where the PDSCH is transmitted as configured as a particular value of schedulingCellID-r10 cannot exceed eight. For example, the number of serving cells where the PDSCH is transmitted whose "schedulingCellID-r10" is set to 1 cannot exceed eight. When the number of serving cells of one serving cell group in a configured serving cell group is five, the number of serving cells where the PDSCH is transmitted as configured as a particular value of schedulingCellID-r10 cannot exceed five. For example, the number of serving cells where the PDSCH is transmitted whose "schedulingCellID-r10" is set to 1 cannot exceed five.

In a second scheme according to the second embodiment, the mapping information of each serving cell index and the CIF may be configured by a predetermined equation and be known to the terminal. The second scheme may apply even when the number of cells configured for the terminal exceeds five, or even when the number of cells configured for the terminal capable of aggregating more than five or eight cells does not exceed five.

An example of the equation according to the second scheme is as in the following Equation 2.

$$CIF = k \bmod K \quad \text{Equation 2}$$

Here, k is the serving cell index, and K is a constant. K may be, e.g., five or eight.

When K=8, CIF=27 mod 8=3 for Scell 27 with a serving cell index of 27. That is, the CIF value of the 27th serving cell is 3.

As another example of configuring a CIF value, the CIF value may be determined in the ascending order of the serving cell indexes of the serving cells scheduled in each scheduling serving cell. When the serving cell indexes of the scheduling cells are 1, 9, and 17, and the serving cell indexes of the serving cells scheduled by the scheduling serving cells are as shown in Table 7, each serving cell index and CIF value are mapped as shown in Table 7.

TABLE 7

| | CIF assigned | | | | | | | |
|---|---|---|---|---|---|---|---|---|
| Scheduling cell index | 0 | 1 | 2 | 3 | 4 | 5 | 6 | 7 |
| Scheduling cell with serving index 1 | 2 | 5 | 10 | 11 | 13 | 15 | 18 | 20 |
| Scheduling cell with serving cell index 9 | 3 | 4 | 6 | 8 | 12 | 14 | 16 | 19 |
| Scheduling cell with serving cell index 17 | 7 | 9 | 17 | 21 | 22 | 23 | 24 | 25 |

The vertical axis in Table 7 above shows the cell indexes of the scheduling serving cells which are respectively 1, 9, and 17. The horizontal axis is the CIF value, and the shade area indicates the cell indexes of the serving cells scheduled. Assuming the serving cells are configured for the terminal in the order of cell indexes 2, 3, 4, 5, 6, 7, 8, 10, 11, 12, 13, 14 . . . of the scheduled serving cells, the CIF value is assigned depending on what number the scheduled serving cell is scheduled by the scheduling serving cell.

In Table 7, for example, although the fourth serving cell is indeed configured third for the terminal, it is assigned CIF 1 because it is scheduled second in the ninth serving cell that is the scheduling serving cell. As another example, although the 13th serving cell is indeed configured eleventh for the terminal, it is assigned CIF 4 because it is scheduled fifth in the first serving cell that is the scheduling serving cell.

When several scheduled serving cells are configured for the terminal to be simultaneously scheduled by one scheduling cell, the CIF values are assigned in ascending order of serving cell indexes, and the terminal determines the serving cell transmitting data through the CIF values. Here, when the configuration of a particular serving cell is released and is removed from the cells configured for the terminal, the CIF values may be reconfigured in the ascending order of cell indexes except the removed cell. For example, when among serving cells 2, 5, 10, 11, 13, 15, 18, and 20 scheduled in the scheduling cell with a serving cell index of 1, the 11th and 13th serving cells are removed from the configuration, and the CIFs of serving cells 2, 5, 10, 15, 18, and 20 may be reconfigured to 0, 1, 2, 3, 4, and 5, respectively. Accordingly, when a scheduled cell is added to the scheduling cell with a serving cell index of 1, CIF values 7 and 8 are assigned to the added cell, and the terminal receives data on the added serving cell according to the CIF values.

In another approach, when the configuration of a particular serving cell is released and the cell is removed from the cells configured for the terminal, the CIF values may maintain their CIF configuration regardless of the removed cell. For example, when among serving cells 2, 5, 10, 11, 13, 15, 18, and 20 scheduled in the scheduling cell with a serving cell index of 1, the 11th and 13th-indexed serving cells are removed from the configuration, and the CIF values of serving cells 2, 5, 10, 15, 18, and 20 may be left with their respective original values 0, 1, 2, 5, 6, and 7. Accordingly, when a scheduled serving cell is added to the scheduling cell with a serving cell index of 1, CIF value 3 or 4 which is assigned to no cell are assigned to the added cell, and the terminal receives data on the added serving cell according to the CIF value 3 or 4 newly assigned.

In the second scheme according to the second embodiment, the mapping information of the serving cell index and the CIF may be configured by higher layer information as shown in Table 8 and be transmitted to the terminal.

TABLE 8

| |
|---|
| S cell 1 with serving cell index 1 is CIF 1 |
| S cell 2 with serving cell index 2 is CIF 2 |
| S cell 3 with serving cell index 3 is CIF 3 |
| S cell 4 with serving cell index 4 is CIF 4 |
| S cell 5 with serving cell index 5 is CIF 0 |
| S cell 6 with serving cell index 6 is CIF 5 |
| S cell 7 with serving cell index 7 is CIF 6 |
| P cell with serving cell index 0 is CIF 7 |
| S cell 8 with serving cell index 8 is CIF 1 |
| S cell 9 with serving cell index 9 is CIF 2 |
| S cell 10 with serving cell index 10 is CIF 3 |
| S cell 11 with serving cell index 11 is CIF 4 |
| S cell 12 with serving cell index 12 is CIF 5 |
| S cell 13 with serving cell index 13 is CIF 6 |
| S cell 14 with serving cell index 14 is CIF 7 |
| S cell 15 with serving cell index 15 is CIF 0 |
| S cell 16 with serving cell index 16 is CIF 0 |
| S cell 17 with serving cell index 17 is CIF 1 |
| S cell 18 with serving cell index 18 is CIF 2 |
| S cell 19 with serving cell index 19 is CIF 3 |
| S cell 20 with serving cell index 20 is CIF 4 |
| S cell 21 with serving cell index 21 is CIF 5 |
| S cell 22 with serving cell index 22 is CIF 6 |
| S cell 23 with serving cell index 23 is CIF 7 |
| S cell 24 with serving cell index 24 is CIF 4 |
| S cell 25 with serving cell index 25 is CIF 3 |
| S cell 26 with serving cell index 26 is CIF 2 |
| S cell 27 with serving cell index 27 is CIF 1 |
| S cell 28 with serving cell index 28 is CIF 0 |
| S cell 29 with serving cell index 29 is CIF 5 |
| S cell 30 with serving cell index 30 is CIF 6 |
| S cell 31 with serving cell index 31 is CIF 7 |

Although in the second embodiment the implicit cell group is a single one by grouping one "scheduling (serving) cell" transmitting the (E)PDCCH and multiple "scheduled (serving) cells" transmitting the PDSCH/PUSCH scheduled by the scheduling cell, it may also be possible to implicitly group into a single group multiple scheduling cells transmitting the (E)PDCCH and multiple scheduled serving cells transmitting the PDSCH/PUSCH scheduled by the multiple scheduling cells.

Now described is a method for transmitting aperiodic channel information according to a third embodiment of the first disclosure.

Methods as proposed herein to keep the CIF to have three bits have been thus far described with respect to the first and second embodiments of the first disclosure. When explicitly grouping cells and transmitting the cell grouping information to the terminal via higher layer information as in the first embodiment of the first disclosure or implicitly grouping cells and transmitting related information to the terminal via higher layer information as in the second embodiment of the first disclosure in order to keep the CIF to have three bits, the base station requests aperiodic channel information (or channel state information) by transmitting the (E)PDCCH in the serving cell in the cell group. Accordingly, the terminal may measure the aperiodic channel information for the cell group configured by the higher layer information and the bit information mapped to the CSI request field of the (E)PDCCH or serving cells in the cell group or the cell group and may transmit to the base station.

Assuming that the cell groups as shown in FIG. 4 are formed by the implicit or explicit scheme, the base station may request the aperiodic channel information for particular cells in the cell group using a two-bit CSI request field. Here, the two bits configured in the CSI request field are previously configured by higher layer information to allow for request of aperiodic channel information for the particular cells and are transmitted to the terminal.

For example, when the CSI request field of the (E)PDCCH transmitted in Scell 1 403 of cell group 1 is '10,' the aperiodic channel information for particular cells, Scell 6 408 and Scell 7 409, in cell group 1 401 may be configured to be measured and transmitted by higher layer information. When the CSI request field of the (E)PDCCH is '10,' the terminal transmits the aperiodic channel information for Scell 6 408 and Scell 7 409, which are the particular cells in cell group 1 401 configured, through higher layer information. As another example when the CSI request field of the (E)PDCCH transmitted in Scell 1 403 of cell group 1 401 is '11,' the aperiodic channel information for particular cells, Pcell 402, Scell 4 406 and Scell 5 407, in cell group 1 401 may be configured to be measured and transmitted by higher layer information. When the CSI request field of the (E)PDCCH is '11,' the terminal transmits the aperiodic channel information for Scell 6 408 and Scell 7 409, which are the particular cells in cell group 1 401 configured, through higher layer information.

Here, the base station may configure the cell group and serving cells in the cell group by higher layer information so that the aperiodic channel information for the serving cells in other cell groups is measured and transmitted together, and transmit to the terminal. For example, when the CSI request field of the (E)PDCCH transmitted in Scell 1 403 of cell group 1 401 is '10,' not only may be configured to be measured and transmitted the aperiodic channel information for Scell 6 408 and Scell 7 409 by the higher layer information, but the channel information for Scell 13 417 in cell group 2 411, Scell 16 422 and Scell 18 424 in cell group 3 421, and Scell 24 432 and Scell 27 435 in cell group 4 431 may be measured and transmitted as well. As another example, when the CSI request field of the (E)PDCCH transmitted in Scell 1 403 of cell group 1 401 is '11,' not only may be configured to be measured and transmitted the aperiodic channel information for Pcell 402, Scell 4 406 and Scell 5 407 by the higher layer information, but the channel information for Scell 8 412 and Scell 9 413 in cell group 2 411, Scell 19 425 in cell group 3 421, and Scell 28 436, Scell 29 437, and Scell 30 438 in cell group 4 431 may be measured and transmitted as well.

When the base station is rendered to measure and transmit the aperiodic channel information only for the serving cells belonging to each cell group, the aperiodic channel information of all of the cell groups may be requested only when as many (E)PDCCHs as the number of the cell groups configured are transmitted. In contrast, as per the scheme proposed herein, the (E)PDCCH having the CSI request field configured with particular bits on a particular serving cell in a particular cell group may be transmitted to request the aperiodic channel information of the serving cells in all of the cell groups. Here, when the (E)PDCCH is transmitted to the terminal in particular serving cells in a particular cell group, the cell groups and the serving cells in the cell groups may be configured by higher layer information according to the CSI request field value and the higher layer information may be transmitted to the terminal so that the aperiodic channel information for the serving cells in other cell group may be requested. The terminal transmits to the base station the aperiodic channel information for the particular cells in the particular cell group from the configured higher layer information.

Meanwhile, not only the aperiodic channel information but also the (E)PDCCH triggering the uplink data channel for transmitting information for uplink control signals including uplink response signals (acknowledgement Ack)/negative acknowledgement Nack) may be transmitted in a particular serving cell in one cell group. Here, I_MCS in the (E)PDCCH is set to have a value among (29 . . . 31), and the size of the CSI request field may be set to two bits. Further, when the higher layer information is configured in the terminal so that the CSI request field may request the aperiodic channel information for at least one or more cell groups and serving cells in the cell groups, the size (or number) of resource blocks where uplink data channel is transmitted may be determined in proportion to the number of cell groups configured for request of the aperiodic channel information or the number of serving cells configured in the cell groups. In the determined resource blocks, the terminal transmits to the base station the uplink data channel including only uplink control signal.

Figure 5A:
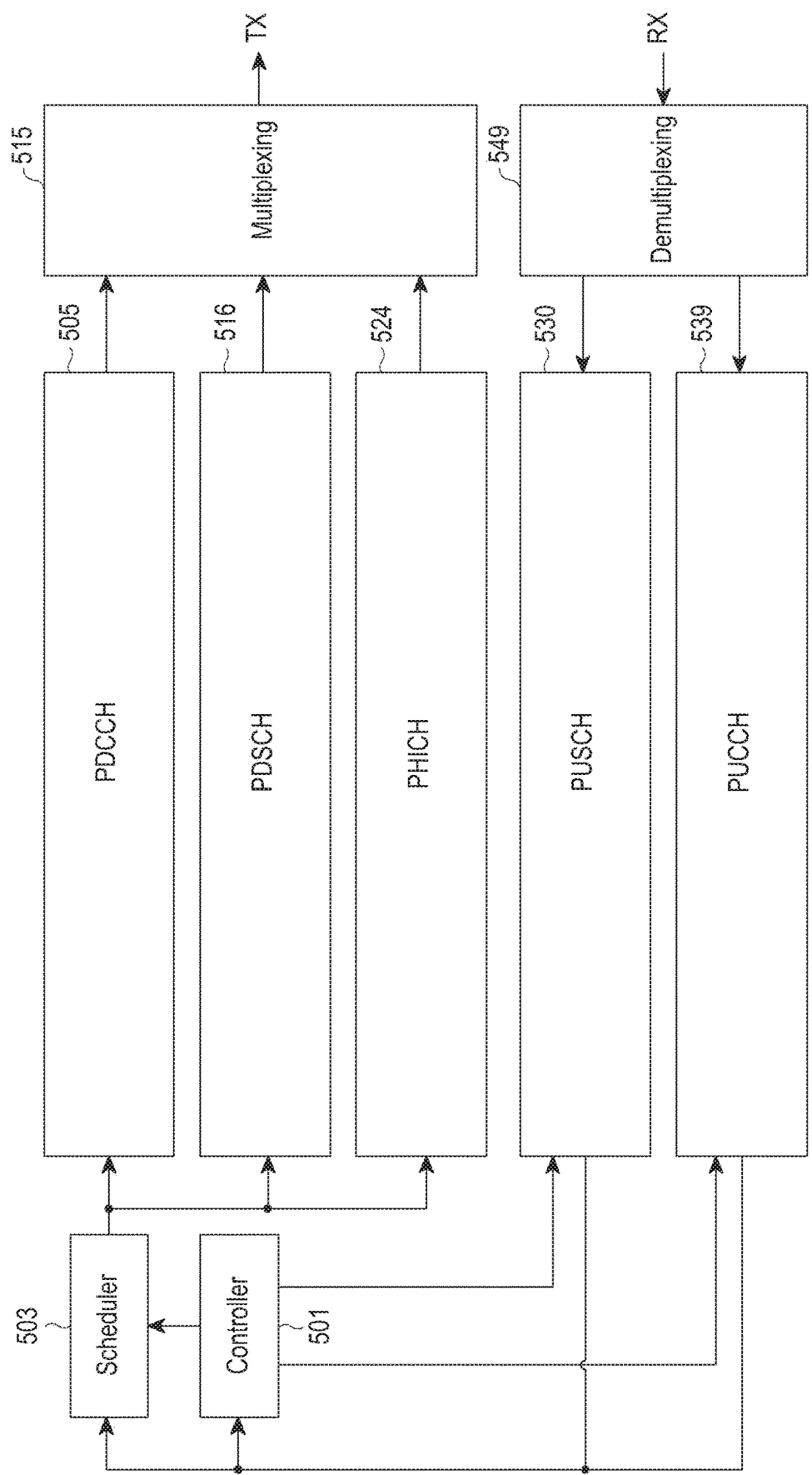
FIG. 5A is block diagrams illustrating the structure of a base station according to an embodiment of the present disclosure.

FIG. 5A is a view illustrating a base station according to an embodiment of the present disclosure.

Referring to FIG. 5A, the base station includes a transmitter including a PDCCH block 505, a PDSCH block 516, a PHICH block 524, and a multiplexer 515, a receiver including a PUSCH block 530, a PUCCH block 539, and a demultiplexer 549, a scheduler 503, and a controller 501 determining the number of serving cells configured in the terminal and controlling grouping the serving cells, mapping serving cell index with CIF, and transmission of downlink control channel. Although multiple transmitters and receivers (except the PUCCH block) may be provided for communication on multiple cells, it is assumed that one transmitter and one receiver are provided for the purpose of description.

The controller 501 determines the number of serving cells configured in the terminal and controls the grouping of serving cells, mapping between serving cell index and CIF, and the transmission of downlink control channel. Specific schemes therefor have been described above. The controller 501 adjusts timing relations between physical channels for the terminal, which the controller 501 is to schedule, by referencing, e.g., the volume of data to be transmitted to the terminal and the amount of resources available in the system and informs the scheduler 503, the PDCCH block 505, the PDSCH block 516, the PHICH block 524, the PUSCH block 530, and the PUCCH block 539.

The PDCCH block 505 configures a control signal under the control of the scheduler 503, and the control signal is multiplexed with other signals by the multiplexer 515. The PDSCH block 516 generates data under the control of the scheduler 503 for the determination of the number of serving cells configured in the terminal, grouping the serving cells, and mapping serving cell index with CIF, and the data is multiplexed with other signals by the multiplexer 515.

The PHICH block 524 generates an HARQ ACK/NACK for the PUSCH received from the terminal under the control of the scheduler 503. The HARQ ACK/NACK together with other signals is multiplexed by the multiplexer 515.

The multiplexed signals are generated into OFDM signals that are then transmitted to the UE.

The PUSCH block 530 in the receiver obtains channel information for the signal received from the terminal from the PUSCH.

The PUCCH block 530 obtains an uplink ACK/NACK or CQI from a signal received from the terminal. The obtained uplink ACK/NACK or CQI is transferred to the scheduler 503 and is used to determine whether to re-transmit the PDSCH and a modulation and coding scheme (MCS). The obtained uplink ACK/NACK is transferred to the controller 501 to adjust the transmission timing of PDSCH.

Figure 5B:
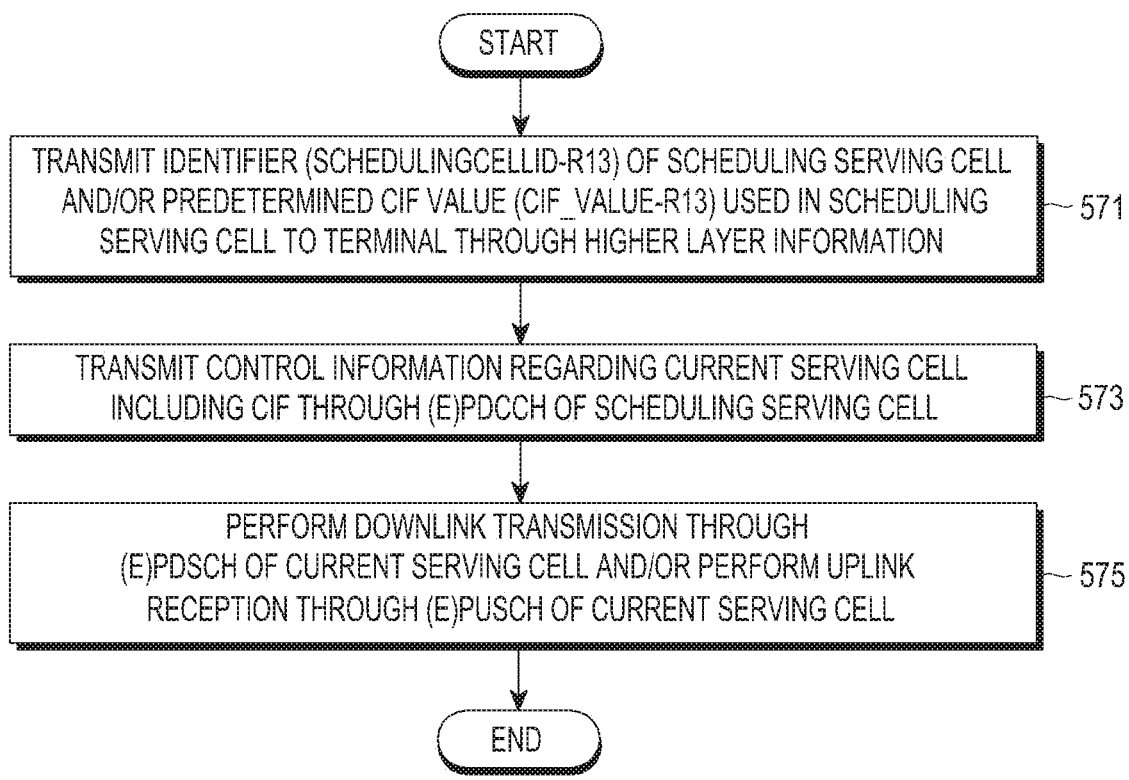
FIG. 5B is a view illustrating an operation of a base station according to an embodiment of the present disclosure.

FIG. 5B is a view illustrating an operation of a base station according to an embodiment of the present disclosure.

In operation 571, the base station transmits to the terminal through higher layer information an identifier (scheduling-CellID-r13) of the scheduling serving cell where control information including the scheduling information on the uplink or downlink regarding the current serving cell is transmitted and/or a predetermined CIF value (cif_value-r13) used in the scheduling serving cell. Meanwhile, the current serving cell and the scheduling serving cell may belong to the same serving cell group. Further, as described above, the serving cell group may be implicitly or explicitly configured in the terminal.

In operation 573, the base station transmits the control information regarding the current serving cell including the CIF having the predetermined value through the (E)PDCCH of the scheduling serving cell.

In operation 575, the base station performs downlink transmission through the (E)PDCCH of the current serving cell and/or uplink reception through the (E)PUSCH of the current serving cell according to the scheduling information.

Figure 6A:
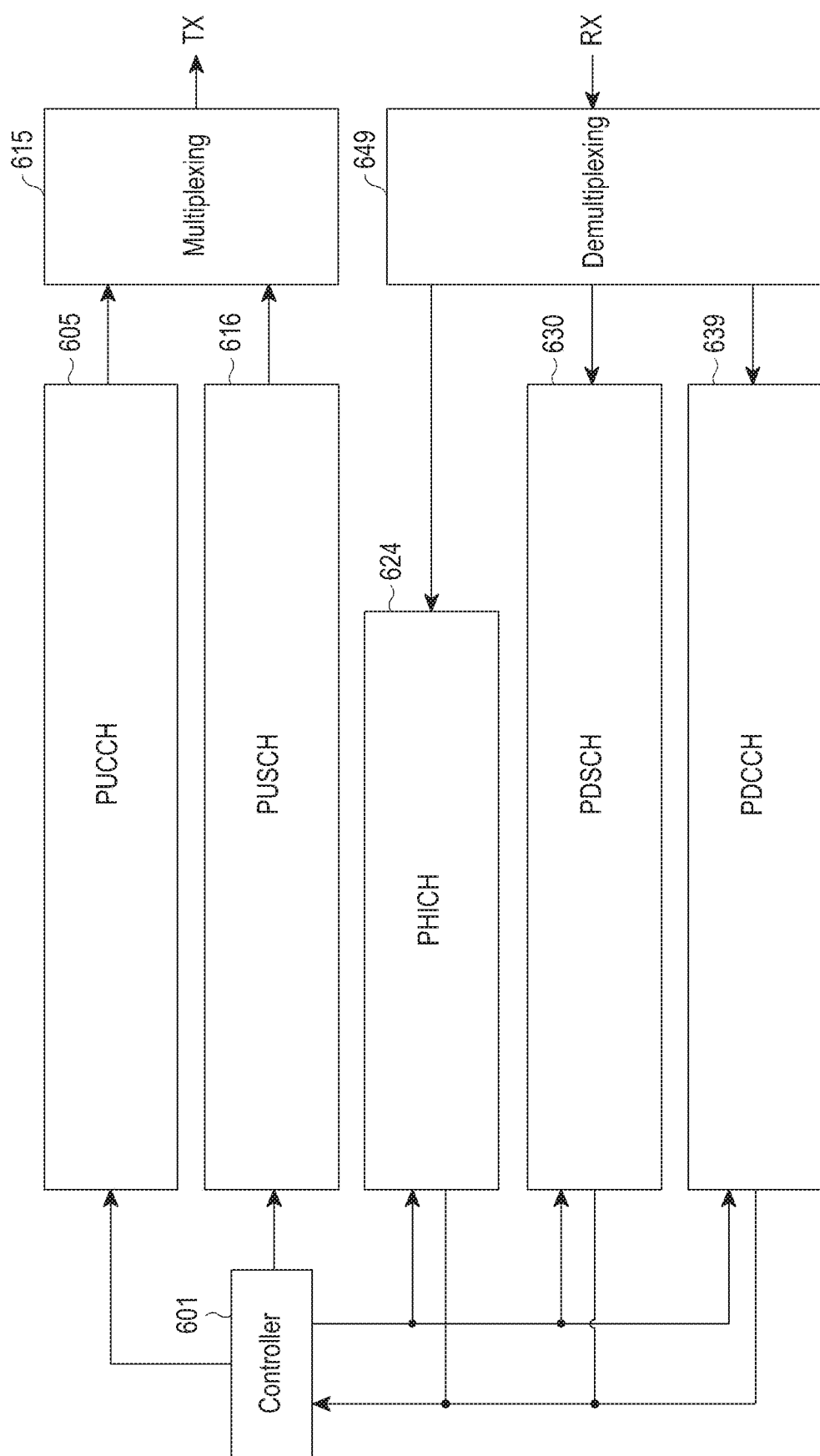
FIG. 6A is block diagrams illustrating the structure of a terminal according to an embodiment of the present disclosure.

FIG. 6A is a view illustrating a UE according to an embodiment of the present disclosure.

The terminal includes a transmitter including a PUCCH block 605, a PUSCH block 616, and a multiplexer 615, a receiver including a PHICH block 624, a PDSCH block 630, a PDCCH block 639, and a demultiplexer 649, and a controller 601 grouping serving cells, mapping serving cell index with CIF in one group, and receiving downlink control channel upon transmission via higher layer information according to the first disclosure. Although multiple transmitters and receivers may be provided for communication on multiple cells, it is assumed that one transmitter and one receiver are provided for the purpose of description.

The controller 601, when the higher layer information is transmitted from the base station according to the first disclosure, groups serving cells, maps serving cell index with CIF in one group, and receives downlink control channel. Specific schemes therefor have been described above. Further, the controller 601 transfers information described above according to the first disclosure to the PDSCH block 630, the PDCCH block 639, the PUCCH block 605, and the PUSCH block 616.

The PUCCH block 605 configures HARQ ACK/NACK or CQI with the uplink control information (UCI) under the control of the controller 601 controlling the storing of downlink data in a soft buffer, and the HARQ ACK/NACK or CQI is multiplexed with other signals by the multiplexer 615 and transmitted to the base station. In the PUSCH block 616, uplink data is multiplexed with other signals in the multiplexer 615. The multiplexed signals are generated into single carrier frequency division multiple access (SC-FDMA) signals and the signals are transmitted to the base station by referring to the period and offset in the method of UCI PUSCH transmission and cell grouping method according to the first disclosure.

The PHICH block 624 in the receiver separates, through the demultiplexer 649, the PHICH signal from the signals received as per the DL/UL HARQ-ACK communication timing from the base station and then obtains whether to HARQ ACK/NACK for the PUSCH. The PDSCH block 630 receives from the base station the higher layer information related to the grouping of the serving cells according to an embodiment of the first disclosure and the mapping between serving cell index and CIF in one group, separates the PDSCH signal through the demultiplexer 649, obtains PDSCH data, and transfers whether there is an error as to the result of decoding the data to the PUCCH block 605 to adjust the generation of the uplink HARQ ACK/NACK. Further, the PDSCH block 630 transfers whether there is an error as to the decoding result to the controller 601 to adjust the timing when transmitting uplink HARQ ACK/NACK.

The PDCCH block 639 separates the PDCCH signal through the demultiplexer 649 considering the grouping of serving cells, mapping between serving cell index and CIF in one group, and downlink control channel reception according to an embodiment of the first disclosure and then decodes the DCI format to obtain the DCI from the decoded signal.

Figure 6B:
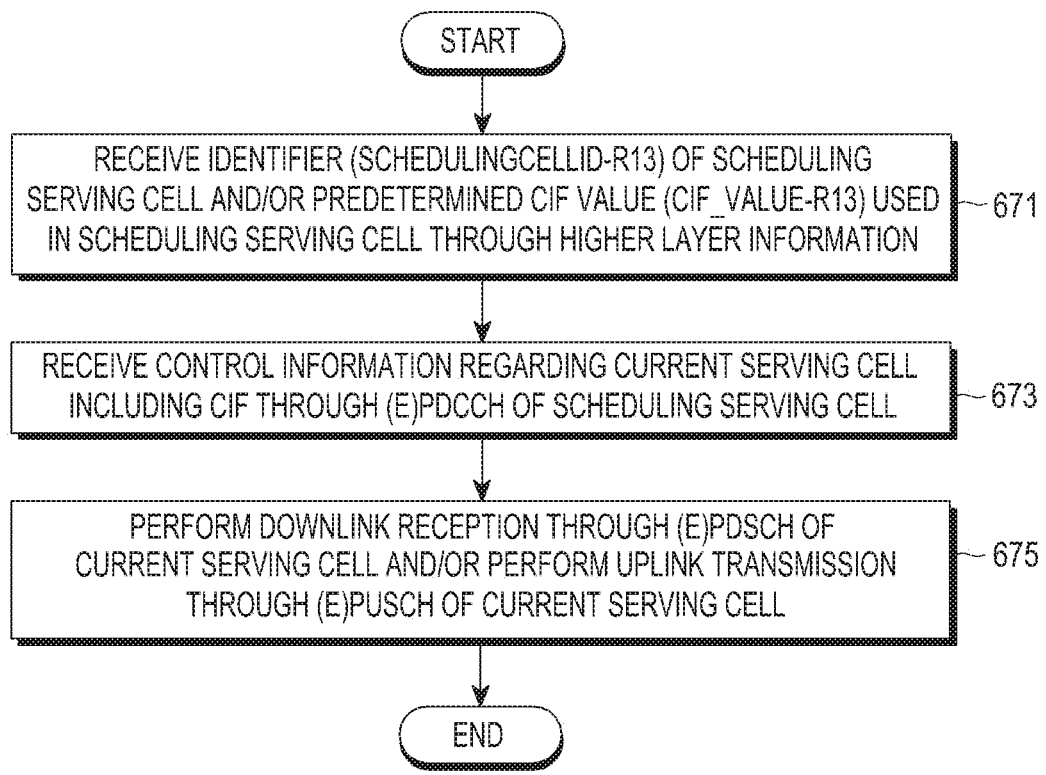
FIG. 6B is a view illustrating an operation of a terminal according to an embodiment of the present disclosure.

FIG. 6B is a view illustrating an operation of a terminal according to an embodiment of the present disclosure.

In operation 671, the terminal receives from the base station through higher layer information an identifier (schedulingCellID-r13) of the scheduling serving cell where control information including the scheduling information on the uplink or downlink regarding the current serving cell is transmitted and/or a predetermined CIF value (cif_value-r13) used in the scheduling serving cell. Meanwhile, the current serving cell and the scheduling serving cell may belong to the same serving cell group. Further, as described above, the serving cell group may be implicitly or explicitly configured in the terminal.

In operation 673, the terminal receives the control information regarding the current serving cell including the CIF having the predetermined value through the (E)PDCCH of the scheduling serving cell from the base station.

In operation 675, the terminal performs downlink reception through the (E)PDSCH of the current serving cell and/or uplink transmission through the (E)PUSCH of the current serving cell according to the scheduling information.

As set forth above, according to the first disclosure, it may be possible to perform cross-carrier scheduling on other cells while maintaining the three-bit CIF when transmitting downlink control channels in a system where up to 32 cells may be aggregated. Further, aperiodic channel information for multiple cells may be transmitted.

Further, it may be possible to perform cross-carrier scheduling on 32 cells while maintaining the 3-bit CIF by implicitly or explicitly grouping cells when the number of the cells configured for the terminal is more than five or eight and designating the cell index mapped to the CIF in each cell group. Accordingly, cross-carrier scheduling may be supported for up to 32 cells while maintaining the information bit size of downlink control channel. Further, aperiodic channel information for multiple cells may be transmitted according to the first disclosure.

Second Disclosure

Hereinafter, a second disclosure is described. First, the basic concept of the second disclosure is described.

In the mobile communication system adopting multiple connections, the major base station (eNB) is in charge of managing radio resources for the terminal, sets a small cell group (SCG) for the terminal, or refers to a measurement result reported from the terminal in order to make a determination, e.g., to change the PSCell for the terminal. Preferably, the terminal reports measurement results for the neighbor cell as well as the serving cell depending on settings made by the base station, so that the measurement result is reported to different neighbor cells depending on the purpose of reporting the measurement result.

According to the second disclosure, the terminal differently determines a non-serving frequency and a serving frequency at which to report the neighbor cell measurement result for the serving frequency depending on the type of event to trigger a measurement result report and reports the neighbor cell measurement result to the base station, thereby reducing the size of the measurement result reporting message and allowing the master base station to make a proper determination related to the management of radio resources.

The second disclosure relates to a method for reporting measurement results for at least one or more neighbor cells and its major concept is as follows.

The terminal receives a control message to configure measurement from the base station, and the terminal having received the control message performs measurement on the neighbor cells of the serving base station and non-serving base station and stores the measurement result. Thereafter, the terminal determines whether it is required to transmit a control message including the measurement result report information and determines whether the control message is a measurement result reporting message (MeasurementReport) or SCG failure reporting message (SCGFFailureInformation). For reference, for the measurement result reporting message and the SCG failure reporting message, 3GPP TS 36.331 may be referenced. Thereafter, the terminal determines a serving frequency neighbor cell measurement result to be included in the control message depending on the type of control message as follows.

If the control message is the measurement result reporting message, and predetermined control information (hereinafter, first control information) indicating to report the neighbor cell measurement result of serving frequency has been received from the base station in the control message configuring the measurement, the physical cell id (PCI) of the best measured cell among the neighbor cells is included in the control message for each serving frequency for all the serving frequencies currently set.

If the control message is the measurement result reporting message, and the first control information has not been included in the message configuring the measurement, the neighbor cell measurement result is not included in the control message for any serving frequency currently set, If the control message is an SCG failure reporting message, the measurement result value and physical cell id (PCI) of the best measured cell per serving frequency for the serving frequency where the SCG serving cell has been set for the serving frequencies currently set are included in the control message regardless of whether the first control information has been included in the control message configuring the measurement.

Thereafter, the terminal determines a non-serving frequency neighbor cell measurement result to be included in the control message depending on the type of control message as follows.

That is, when the control message is the measurement result reporting message, as many neighbor cell measurement results as a predetermined maximum number for the first non-serving frequency are included, and when the control message is the SCG failure reporting message, as many neighbor cell measurement results as another maximum number for the second non-serving frequency are included. The number of first non-serving frequencies is fixed to one, and the first non-serving frequency is specified by a measured target associated with the measurement result reporting message. Meanwhile, the neighbor cell measurement result for the first frequency includes a measurement result value and a first layer cell identifier, the number of second non-serving frequencies is the same as the number of non-serving frequencies configured in the terminal, and the neighbor cell measurement result for the second non-serving frequency includes an absolute radio frequency channel number (ARFCN) indicating the non-serving frequency, a measurement result value, and the first layer cell identifier.

For the following reasons, different pieces of information are used as the neighbor cell measurement information for the measurement result reporting message and the neighbor cell measurement information of the SCG failure message.

The measurement result reporting message is a message that is transmitted from the terminal to the base station in a typical, normal environment in a normal radio resource management process, and it is preferable to receive report of many neighbor cell measurement results for the non-serving frequency indicated by the base station among the non-serving frequencies configured in the terminal.

For example, assuming that four non-serving frequencies f1, f2, f3, and f4 are configured in the terminal, and f1 and f2 are non-serving frequencies set for shift between frequencies, and f3 and f4 are non-serving frequencies set for multi-connection setup, the neighbor cell measurement results of f3 and f4 which are non-serving frequencies related to the multi-connection setup may not be taken as useful information in the measurement result reporting message related to the shift between frequencies. The SCG failure reporting message is a message reported to the master base station for unpredicted SCG failure. Here, the SCG failure may be classified as an abnormal situation, such as when the channel quality of PSCell among SCG serving cells has been deteriorated in such extend that it is inappropriate for performing communication, or when random access has failed. Here, the information needed for the base station is information that allows for determination of the serving cell to replace the PSCell where the failure has occurred, and accordingly, the neighbor cell measurement information for the serving frequency of the SCG among the serving frequencies currently set corresponds to that. Further, another available scheme is to change the SCG frequency into one of the non-serving frequencies as set, and in that sense, the non-serving frequency neighbor cell measurement information is also useful information. However, as compared with the measurement result reporting message including the neighbor cell measurement information for one non-serving frequency, the SCG failure reporting message including the neighbor cell measurement information for multiple non-serving frequencies requires the size of the neighbor cell measurement information to be limited. Accordingly, the measurement result reporting message includes multiple neighbor cell measurement results for one non-serving frequency, and the SCG failure reporting message includes one neighbor cell measurement result per frequency for multiple non-serving frequencies.

Hereinafter, embodiments of the second disclosure are described.

Figure 7:
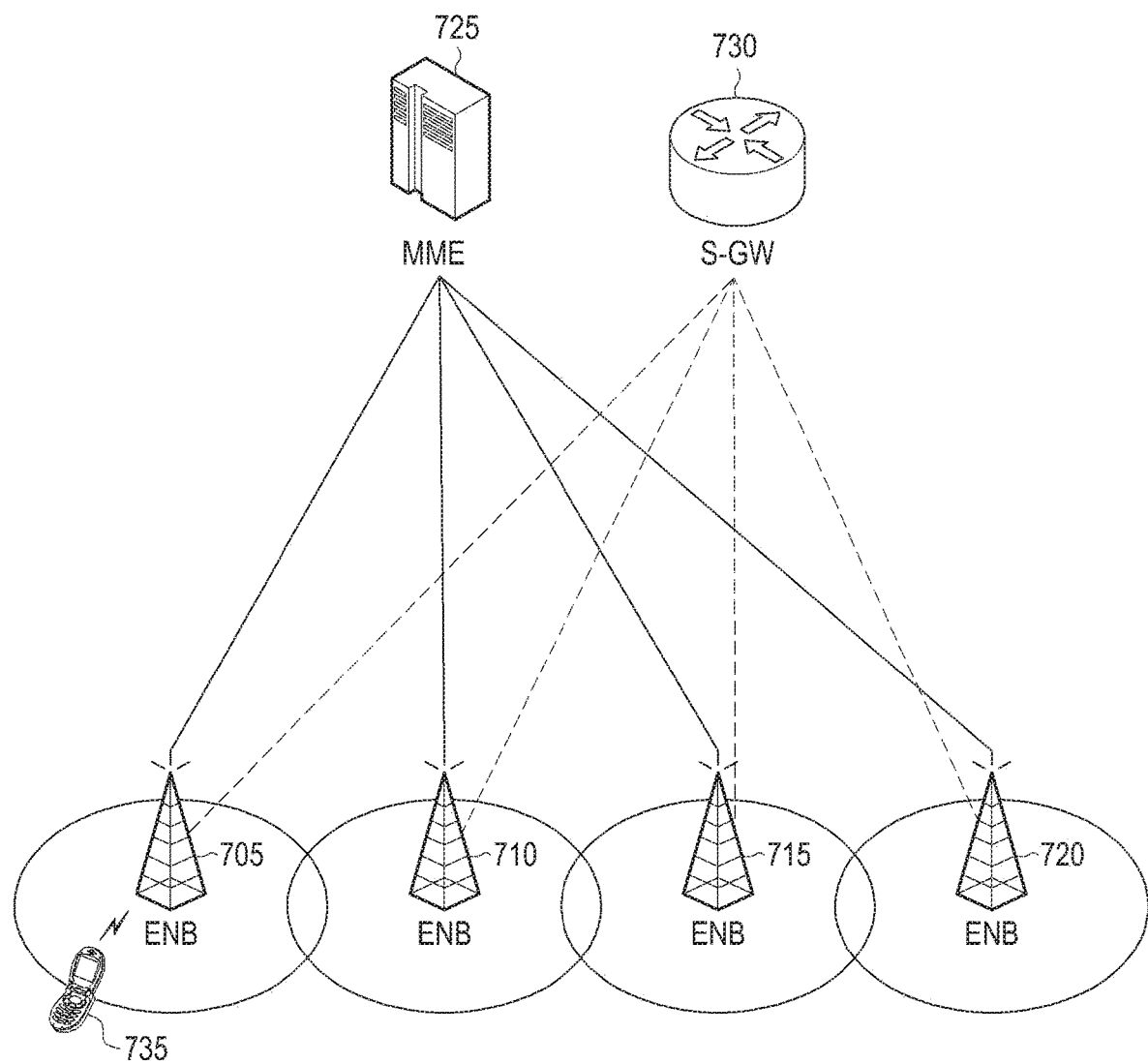
FIG. 7 is a view schematically illustrating the structure of an LTE system according to an embodiment of the present disclosure.

FIG. 7 is a view schematically illustrating the structure of an LTE system according to an embodiment of the present disclosure.

Referring to FIG. 7, a radio access network of the LTE system includes next-generation base stations (evolved node B, hereinafter, "ENB," "Node B," or "base station") 705, 710, 715, and 720, a mobility management entity (MME) 725, and a serving gateway (S-GW). A user equipment (hereinafter, "UE" or "terminal") 735 accesses an external network through the ENB 705, 710, 715, and 720 and the S-GW 730.

The ENBs 705, 710, 715, and 720 of FIG. 7 correspond to legacy node Bs in the universal mobile telecommunication system (UMTS) system. The ENBs 705, 710, 715, and 720 are connected with the UE 735 through a wireless channel and plays a more complicated role than the legacy node B.

Since in the LTE system all user traffic as well as real-time services, such as voice over Internet protocol (VoIP) service through an Internet protocol is serviced through a shared channel, there is needed an apparatus that performs scheduling by compiling state information, such as UEs' buffer states, available transmit power states, or channel states, and the ENBs 705, 710, 715, and 720 are in charge of the same. One ENB typically controls multiple cells. The LTE system adopts, as a radio access technology, orthogonal frequency division multiplexing (hereinafter, "OFDM") on a 20 MHz bandwidth in order to implement a high data transmission speed. Further, the ENBs 705, 710, 715, and 720 use adaptive modulation & coding (AMC) that determines a modulation scheme and a channel coding rate in compliance with the channel state of the terminal 735.

The S-GW 730 is a device providing a data bearer, and the serving gateway 730 generates or removes a data bearer under the control of the MME 725. The MME 725 is an apparatus that is in charge of various control functions as well as mobility management functions for the UE 735 and is connected with multiple base stations. The structure of LTE system has been described with reference to FIG. 7 according to an embodiment of the present disclosure. Next, the structure of radio protocol in the LTE system according to an embodiment of the second disclosure is described with reference to FIG. 8.

Figure 8:
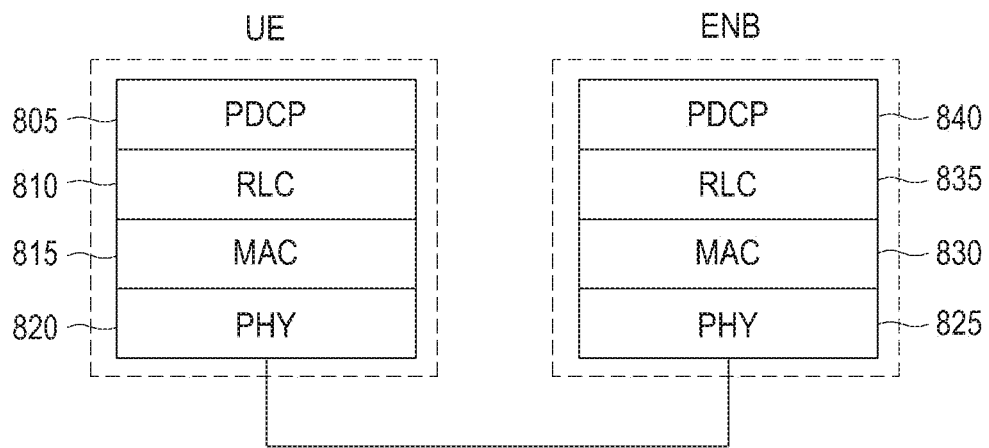
FIG. 8 is a view schematically illustrating the radio protocol structure in an LTE system according to an embodiment of the present disclosure.

FIG. 8 is a view schematically illustrating the radio protocol structure in an LTE system according to an embodiment of the present disclosure.

Referring to FIG. 8, the respective radio protocols of the UE and the ENB in the LTE system, respectively, include Packet Data Convergence Protocol Layers (hereinafter, "PDCP layers") 805 and 840, Radio Link Control Layers (hereinafter, "RLC layers") 810 and 835, and Medium Access Control Layers (MAC layers) 815 and 830.

The packet data convergence protocol (PDCP) layers 805 and 840 are in charge of an operation such as compression/restoration, and the radio link control (RLC) layers 810 and 835 reconfigure packet data units (PDUs) into a proper size to perform an automatic repeat request (ARQ) operation.

The MAC layers 815 and 830 are connected to several RLC layer devices configured in one UE and multiplexes RLC PDUs into an MAC PDU and demultiplexes the MAC PDU to generate RLC PDUs. The physical layers 820 and 825 channel-code and modulate higher layer data into OFDM symbols, transmit the OFDM symbols through a wireless channel or demodulates OFDM symbols received through a wireless channel, channel-decodes and transfers the same to a higher layer.

The structure of radio protocol in the LTE system has been described with reference to FIG. 8 according to an embodiment of the present disclosure. Next, a carrier aggregation operation in the base station in the LTE system is described with reference to FIG. 9, according to an embodiment of the present disclosure.

Figure 9:
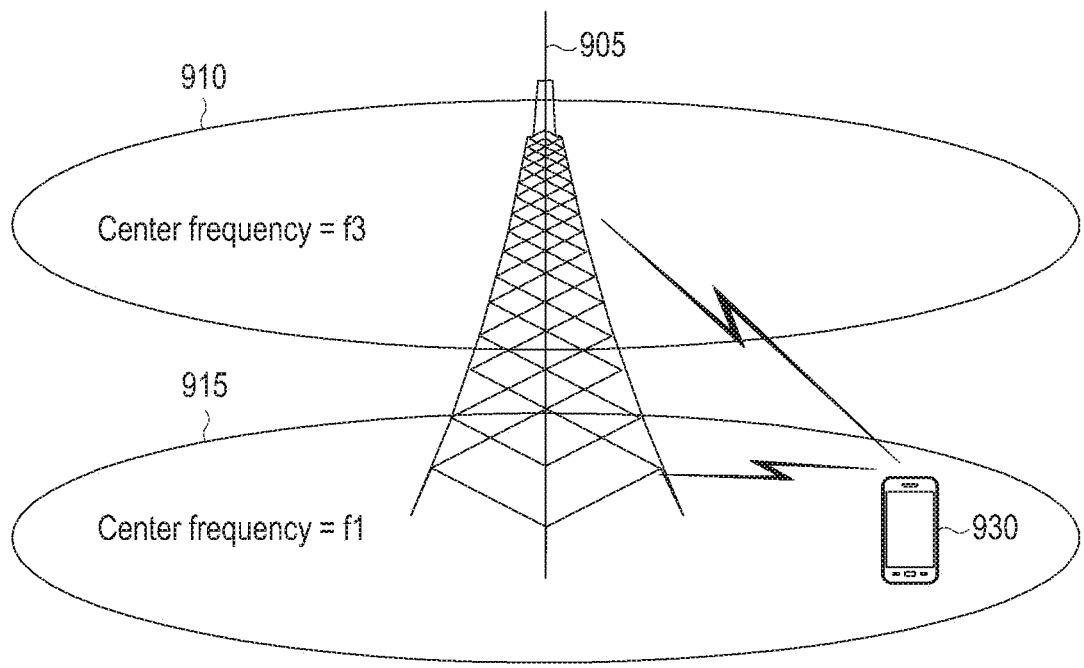
FIG. 9 is a view schematically illustrating a carrier aggregation operation in a base station in an LTE system according to an embodiment of the present disclosure.

FIG. 9 is a view schematically illustrating a carrier aggregation operation in a base station in an LTE system according to an embodiment of the present disclosure.

Referring to FIG. 9, one base station may generally transmit and receive multiple carriers over several frequency bandwidths. For example, when a carrier 915 with a forward center frequency f1 and a carrier 910 with a forward center frequency f3 are transmitted from the base station 905, one UE conventionally communicates data using one of the two carriers.

However, a carrier aggregation-enabled UE may communicate data through a number of carriers at the same time. The base station 905 may increase the transmission speed of the UE 930 by allocating more carriers to the carrier aggregation-enabled UE 930 depending on circumstances. As described above, aggregation of a forward carrier and backward carrier transmitted and received by one base station is referred to as intra-base station carrier aggregation. However, in some cases, unlike that shown in FIG. 9, it may be needed to aggregate forward and backward carriers transmitted and received by different base stations.

The intra-base station carrier aggregation operation in the LTE system has been described with reference to FIG. 9 according to an embodiment of the second disclosure. Next, a carrier aggregation operation between base stations in the LTE system is described with reference to FIG. 10, according to an embodiment of the second disclosure.

Figure 10:
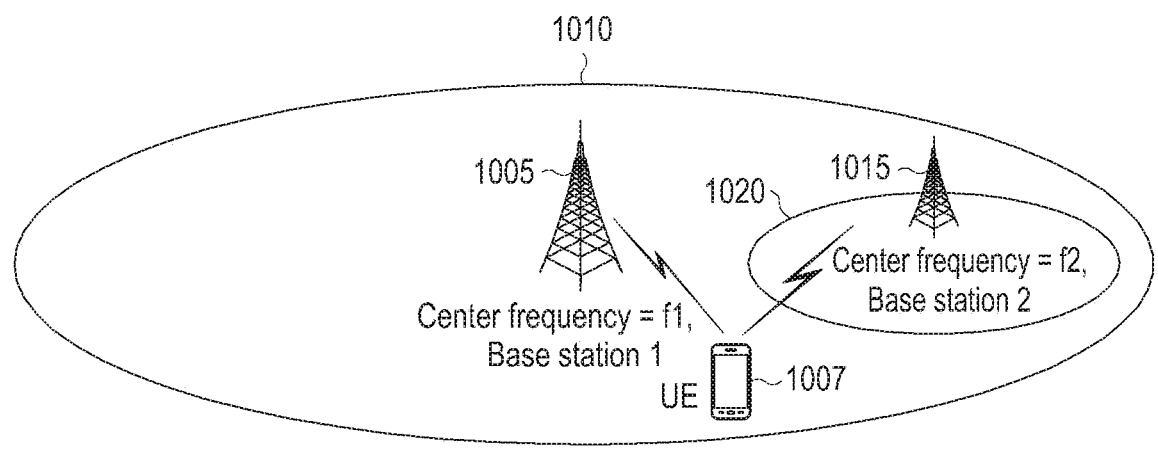
FIG. 10 is a view schematically illustrating a carrier aggregation operation between base stations in an LTE system according to an embodiment of the present disclosure.

FIG. 10 is a view schematically illustrating a carrier aggregation operation between base stations in an LTE system according to an embodiment of the present disclosure.

Referring to FIG. 10, when a base station 1 1005 communicates a carrier with a center frequency f1 in area 1010, and a base station 2 1015 communicates a carrier with a center frequency f2 in area 1020, if a UE 1007 aggregates the carrier with the forward center frequency f1 and the carrier with the forward center frequency f2, it ends up one UE aggregating carriers communicated by two or more base stations. In an embodiment of the second disclosure, this is denoted inter-ENB carrier aggregation. According to an embodiment of the second disclosure, the inter-ENB carrier aggregation is denoted dual connectivity (DC).

For example, the DC having been set means that inter-ENB carrier aggregation has been set, that one or more cell groups have been set, that a secondary cell group (SCG) has been set, that there has been set at least one secondary cell (SCell) controlled by a base station other than the serving base station, that a primary SCell (pSCell) has been set, that a MAC entity has been set for serving eNB (SeNB), or that two MAC entities have been configured in the terminal.

Meanwhile, the terms frequently used in describing embodiments of the present disclosure are briefly described below.

In a traditional sense, when one forward carrier transmitted from one base station and one uplink carrier received by the base station constitute one cell, carrier aggregation may be appreciated as a UE communicating data through several cells at the same time. Here, the maximum transmission speed and the number of carriers aggregated have a positive correlation.

Hereinafter, in embodiments of the present disclosure, a "UE receives data through a forward carrier or transmits data through an uplink carrier" identically means that "data is communicated using a control channel and data channel corresponding to a frequency band and center frequency specifying the carriers. Particularly in the following embodiments of the present disclosure, carrier aggregation is represented as "multiple serving cells are set" and the terms such as primary serving cell (PCell) and secondary serving cell (SCell) or activated serving cell are used. The terms have the same meanings as those used in the LTE mobile communication system. In embodiments of the second disclosure, it should be noted that the terms "carrier," "component carrier," and "serving cell" may be interchangeably used.

In embodiments of the present disclosure, a group of serving cells controlled by the same base station is defined as a cell group or carrier group (CG). Cell groups are divided into master cell groups (MCGs) and secondary cell groups (SCGs).

The MCG means a group of serving cells controlled by the base station controlling PCells (hereinafter, master base station, MeNB), and the SCG means a group of serving cells controlled by the base station, which is not the base station controlling the PCells, i.e., base station controlling only SCells, (hereinafter, slave base station, SeNB). Whether a particular serving cell belongs to the MCG or SCG is informed the terminal by the base station while setting up the corresponding serving cell.

One MCG and one or more SCGs may be configured in one terminal, and in embodiments of the second disclosure, for ease, the case where only one SCG is set is considered, but although one or more SCGs are set up, the description of the second disclosure may apply as it is without any addition or change. PCell and SCell are terms to indicate the type of a serving cell configured in the terminal. A few differences lie between the PCell and the Scell, e.g., the PCell always remains activated while the SCell may switch between activated state and inactivated state by an instruction from the base station. The mobility of terminal is controlled centering on the PCell, and the SCell may be appreciated as an additional serving cell for data communication. In embodiments of the second disclosure, the PCell and the SCell mean the PCell and the SCell defined in 36.331 or 36.321 of the LTE standard.

Figure 11:
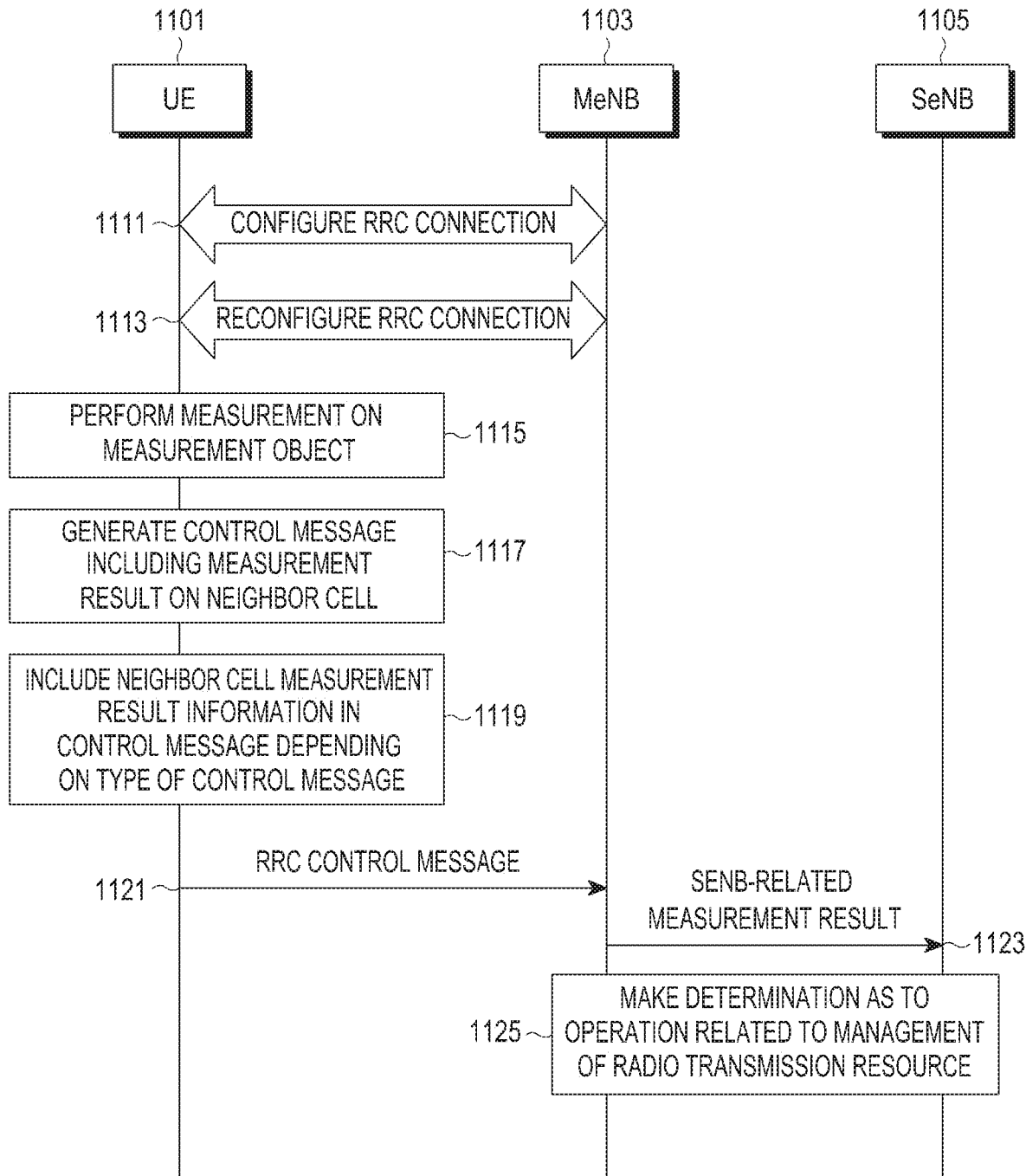
FIG. 11 is a view illustrating an overall operation between a terminal and a master base station and secondary base station according to an embodiment of the present disclosure.

FIG. 11 is a view illustrating an overall operation between a terminal and a master base station and secondary base station according to an embodiment of the present disclosure.

In a mobile communication system including a terminal 1101, a master base station 1103, and a secondary base station 1105, the terminal 1101 establishes an RRC connection with the master base station 1103 (1111). The establishment of the RRC connection is completed as the terminal transmits an RRCConnectionRequest message to the base station, the base station transmits an RRCConnectionSetup message to the terminal, and the terminal transmits an RRCConnectionSetupComplete message to the base station. The RRCConnectionRequest message includes an identifier of the terminal, and the RRCConnectionSetupComplete messages includes various configuration information for RRC connection, e.g., measurement configuration information (hereinafter, MeasConfig). The terminal may transmit a service request control message to the core network using the RRCConnectionSetupComplete message, and the core network may instruct the master base station to configure a data radio bearer (DRB) that may accept the service request. The master base station performs an RRC connection reconfiguration process with the terminal to configure, e.g., DRB (1113). The RRC connection reconfiguration process is completed as the base station transmits an RRCConnectionReconfiguration message to the terminal, and the terminal transmits an RRCConnectionReconfigurationComplete message to the base station.

The RRCConnectionReconfiguration message includes multi-connection configuration information or carrier aggregation information and allows for multi-connection configuration to the terminal or carrier aggregation to the connection. The RRCConnectionReconfiguration message may also include a MeasConfig. The MeasConfig includes at least one measurement object information (hereinafter, measObject), at least one reporting configuration information (hereinafter, ReportConfig), and at least one identifier (measurement identification, hereinafter measId). One measurement is specified by one measId, and one measId is connected to one measObject and one ReportConfig. The measObject information includes carrier frequency information specified by a radio frequency channel number (ARFCN). The ReportConfig information is information to specify a condition of triggering the measurement result reporting message and includes information such as an indicator specifying the triggering condition such as, e.g., 'the measurement result reporting is triggered if the channel quality of neighbor cell is not less than a predetermined reference value,' or 'the measurement result reporting is triggered if the channel quality of neighbor cell is better than the channel quality of serving cell by a predetermined reference value or more,' and relevant reference values. Further, when multiple serving frequencies are set, control information (hereinafter, first control information) indicating whether to include the best neighbor cell measurement result per serving frequency may also be included in the reporting configuration information. One measurement object and one reporting configuration are combined to configure one measurement. The terminal, if a measurement result reporting condition for any measurement is met, generates a measurement result reporting message and transmits to the base station, and includes the measId in the measurement result reporting message in order to specify which measurement the measurement result relates to.

The terminal periodically performs measurement on the measurement object configured in the MeasConfig while performing a multi-connection operation with the master base station and the secondary base station (1115). The period at which the measurement is conducted is determined by the DRX period configured in the terminal. The measurement object may be set for the serving frequency and non-serving frequency of the terminal. If multi-connection and carrier aggregation has been configured in the terminal, several serving cells are configured in the terminal. Accordingly, the number of serving frequencies configured in the terminal is the same as the number of serving cells configured in the terminal. The measurement for non-serving frequency is set for the mobility of the terminal or load balancing. Accordingly, the number of non-serving frequencies configured in the terminal may vary depending on the location or current serving frequency of the terminal, load situation per cell, and traffic of the terminal. As the number of non-serving frequencies set increases, the terminal needs to more frequently adjust the RF circuit, and thus, the base station takes caution to prevent too many non-serving frequencies from being set per terminal.

At some time, a control message including a measurement result for the neighbor cell is generated (1117). For example, this occurs when a measurement result reporting condition for one measurement as set is met or when an SCG failure occurs. If the channel status of the PSCell being under a predetermined reference lasts for a predetermined time or more, the terminal determines that an SCG failure occurred and generates an SCG failure reporting message. Or, if the measurement result reporting condition for one of the measurements as set is met, the terminal generates a measurement result reporting control message.

The terminal includes the neighbor cell measurement result information in the control message depending on the type of control message as follows (1119) and transmits the control message to the master base station (1121).

TABLE 9

| Measurement report | SCG failure indication |
|---|---|
| Neighbor cell measurement result of serving frequency If the first control information was included in the report configuration information connected with the corresponding measId, include the measurement result of the best neighbor cell (the neighbor cell with the best channel quality except the serving cell at the corresponding frequency) for each of all the serving frequencies configured in the terminal (i.e., all the frequencies of all of the serving cells configured in the terminal). Neighbor cell measurement result of non-serving frequency include the PCI and measurement results of n best neighbor cells among neighbor cells measured at the frequency of measurement object connected with the corresponding measId where n is indicated by the measurement object information connected with the corresponding measId | Neighbor cell measurement result of serving frequency include the measurement result of the best neighbor cell per serving frequency for the SCG serving cell among the serving frequencies configured in the terminal regardless of whether the neighbor cell is included in the report configuration information Neighbor cell measurement result of non-serving frequency include ARFCN information specifying the non-serving frequency and PCI and measurement results of m best neighbor cells for each of all frequencies, which are not the current serving frequency (i.e., neither MCG serving cell nor SCG serving cell is set), i.e., all the non-serving frequencies configured in the terminal, among the frequencies related to the measurement object where M is a predetermined integer, e.g., 1. |

The master base station 1103 records in the memory measurement result information related to itself, e.g., measurement result information related to the frequency managed by the master base station, from the measurement result reporting message and refers to the measurement result information for radio resource management determination such as mobility management. It includes, in a predetermined control message, a measurement result report related to the secondary base station 1105, e.g., a measurement result report for the SCG serving frequency or measurement result report for a frequency managed by the secondary base station 1105, and transfers to the secondary base station 1105 (1123).

The master base station 1103 and the secondary base station 1105 may perform operations related to radio transmission resource management, e.g., changing PSCells, changing SCGs, or determination for handover, considering the measurement result reported from the terminal (1125).

Figure 12:
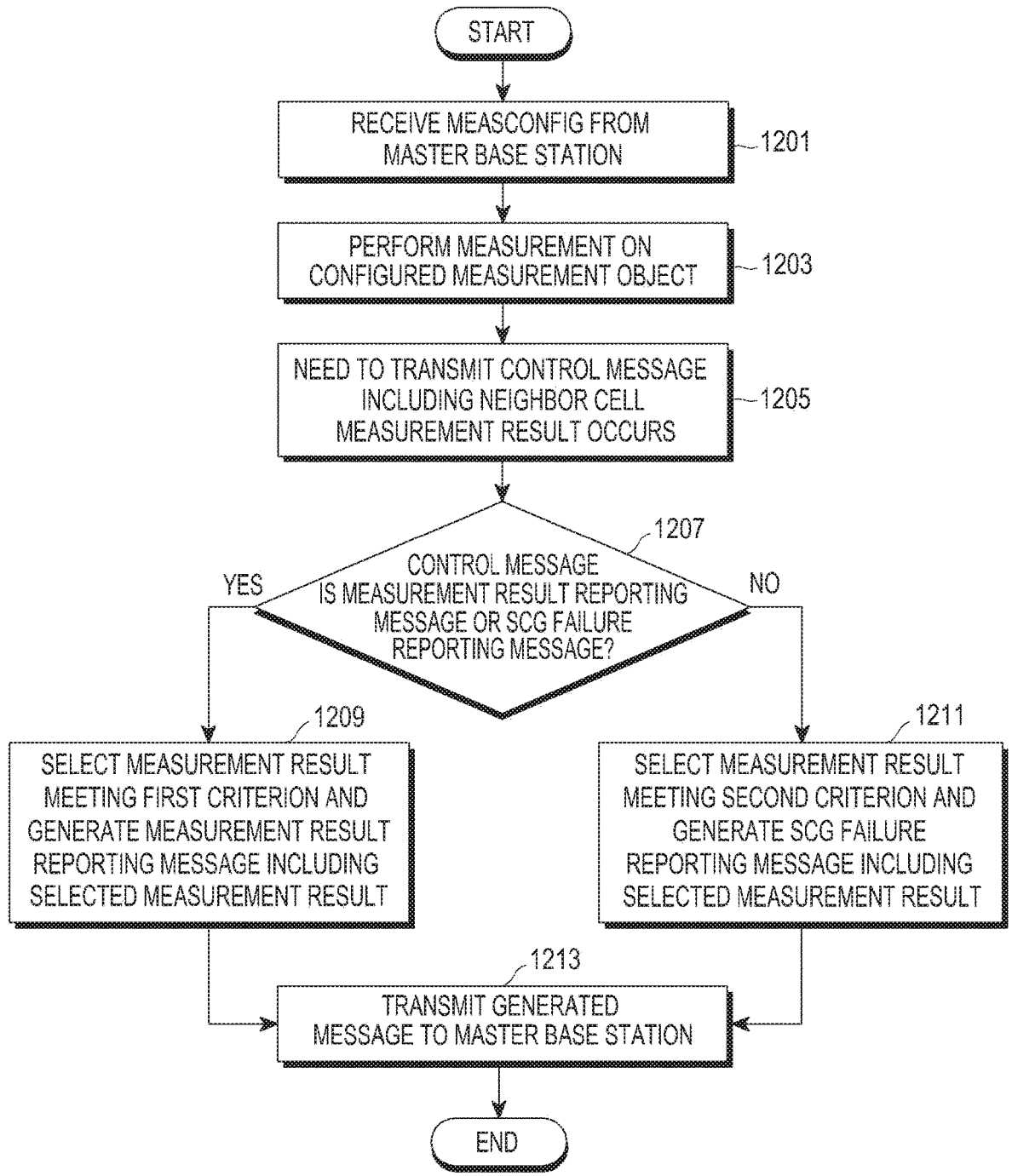
FIG. 12 is a view illustrating an operation of a terminal according to an embodiment of the present disclosure.

FIG. 12 is a view illustrating an operation by a terminal according to an embodiment of the present disclosure.

In operation 1201, the terminal receives measurement configuration information (MeasConfig) from the master base station, and in operation 1203, the terminal performs measurement on a configured measurement object. One measurement object specifies one frequency, and one measurement object may specify a serving frequency or non-serving frequency depending on the frequency of the serving cell configured in the terminal. When such need occurs as to transmit a control message including neighbor cell measurement result in operation 1205, the terminal determines the type of the control message in operation 1207. That is, the terminal determines whether the control message is a measurement result reporting message or SCG failure reporting message. If it is the measurement result reporting message, it goes to operation 1209 and if it is the SCG failure reporting message, it goes to operation 1211.

In operation 1209, the terminal selects a measurement result meeting a predetermined first criterion as described above in connection with Table 9 among available neighbor cell measurement results, generates a measurement result reporting message including the selected measurement result and goes to operation 1213. Meanwhile, in operation 1211, the terminal selects a measurement result meeting a predetermined second criterion as described above in connection with Table 9 among available neighbor cell measurement results, generates an SCG failure reporting message including the selected measurement result and goes to operation 1213. In operation 1213, the terminal transmits the control message generated in operation 1209 or 1211. To that end, the terminal sends a request for transmission resource to the master base station, and when the transmission resource is assigned by the base station, the terminal transmits the control message to the master base station (or through MCG serving cell).

Figure 13:
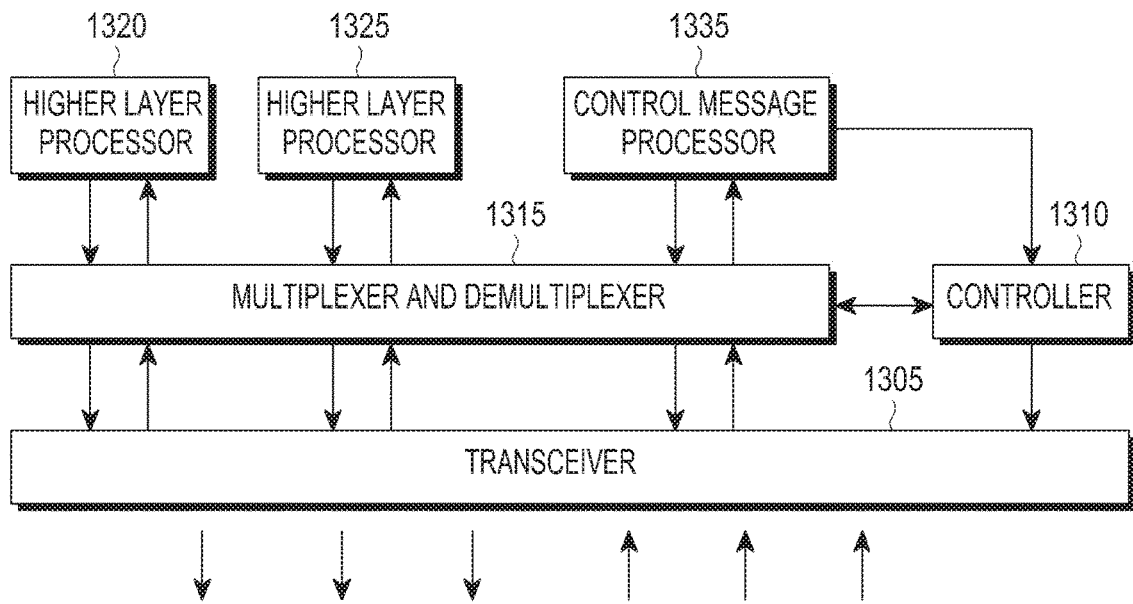
FIG. 13 is a view illustrating a configuration of a terminal according to an embodiment of the present disclosure.

FIG. 13 is a view illustrating a configuration of a terminal according to an embodiment of the present disclosure.

Referring to FIG. 13, according to an embodiment of the second disclosure, the UE may include a communication unit 1305, a controller 1310, a multiplexing and demultiplexing unit 1315, a control message processor 1335, and at least one of various higher layer processors 1320 and 1325.

The multiplexing and demultiplexing unit 1315 and the controller 1310 may configure an MAC device, and although not differentiated for ease in FIG. 13, when a DC is configured in the terminal, an MAC device for MCG and an MAC device for SCG may be separately configured.

The communication unit 1305 may receive data and a predetermined control signal through the forward channel of the serving cell and may transmit data and a predetermined control signal through a reverse channel. When multiple serving cells are configured, the communication unit 1305 may perform data communication and communication of control signals through the multiple serving cells. The communication unit 1305 may include one or more radio frequency (RF) circuit/front ends, and an RF circuit/front end operation frequency may be set under the control of the controller 1310. The communication unit 1305 may perform measurement between frequencies at a predetermined time under the control of the controller 1310 or may receive a signal from the current serving cell at a predetermined time, or may transmit a signal to the serving cell.

The multiplexing and demultiplexing unit 1315 may multiplex data generated in the higher layer processors 1320 and 1325 or the control message processor 1335 or demultiplex data received from the communication unit 1305 and may transfer the resultant data to a proper higher layer processors 1320 and 1325 or the control message processor 1335.

The control message processor 1335 is an RRC layer device, and may process a control message received from the base station and perform a necessary operation. For example, it may receive an RRC control message and transfer, e.g., measConfig or DRX information to the controller 1310.

The higher layer processors 1320 and 1325 may be configured per service. The higher layer processors 1320 and 1325 may process data generated in a user service, such as file transfer protocol (FTP) or VoIP and transfer the processed data to the multiplexing and demultiplexing unit 1315, or may process data transferred from the multiplexing and demultiplexing unit 1315 and transfer the processed data to a higher layer service application.

The controller 1310 may identify a scheduling command received through the communication unit 1305, e.g., an uplink grant or downlink assignment, and control the communication unit 1305 and the multiplexing and demultiplexing unit 1315 so that uplink transmission or downlink reception is performed through a proper transmission resource at a proper time. The controller 1310 may be in charge of various control operations of the terminal as described above. That is, the controller 1310 may control the terminal's operations among those described in connection with FIGS. 11, 12, and 13.

Figure 14:
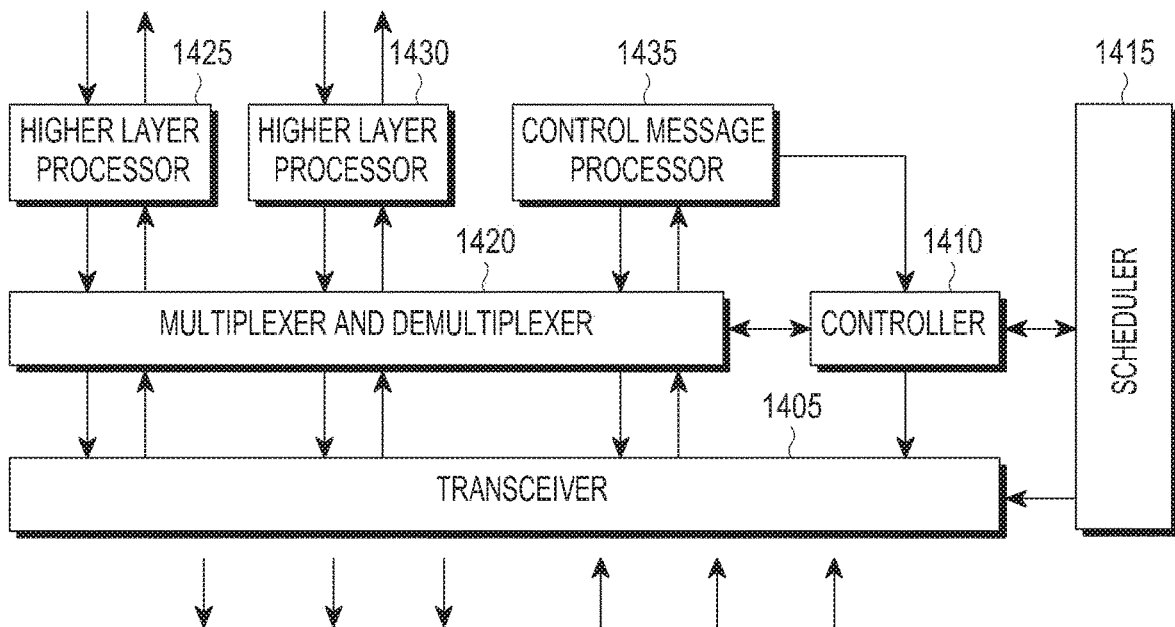
FIG. 14 is a view illustrating a configuration of a base station according to an embodiment of the present disclosure.

FIG. 14 is a view illustrating a configuration of a base station according to an embodiment of the present disclosure.

The base station may include at least one of a communication unit 1405, a controller 1410, a multiplexing and demultiplexing unit 1420, a control message processor 1435, various higher layer processors 1425 and 1430, and a scheduler 1415.

The communication unit 1405 may transmit data and a predetermined control signal through a forward carrier and receive data and a predetermined control signal through a backward carrier. When multiple carriers are configured, the communication unit 1405 may conduct communication of data and control signals through the multiple carriers.

The multiplexing and demultiplexing unit 1420 may multiplex data generated in the higher layer processors 1425 and 1430 or the control message processor 1435 or demultiplex data received from the communication unit 1405 and may transfer the resultant data to a proper higher layer processors 1425 and 1430, the control message processor 1435 or the controller 1410.

The control message processor 1435 may process control message transmitted from the UE and perform necessary operations, or generate control messages to be transferred to the UE and transfer the control messages to a lower layer.

The higher layer processors 1425 and 1430 may be configured per bearer and configure data transferred from an S-GW or other ENB in an RLC PDU and transfer to the multiplexing and demultiplexing unit 1420, or configure an RLC PDU transferred from the multiplexing and demultiplexing unit 1420 in a PDCP SDU and transfer to the S-GW or the other ENB.

The scheduler 1415 may allocate transmission resources to the UE at a proper time considering the UE's buffer state and channel state and may process the signal transmitted from the terminal to the communication unit 1405 or perform a process to transmit a signal to the terminal.

The controller 1410 may be in charge of the operations related to the above-described measurement and radio resource control. That is, the controller 1410 may control the base station's operations among those described in connection with FIGS. 11, 12, and 13.

Third Disclosure

Hereinafter, a third disclosure is described.

According to the third disclosure, the terminal's operation to address intra-device interference is proposed.

When various communication protocols (e.g., legacy cellular network protocols, such as LTE and UMTS, wireless LAN and Bluetooth, global navigation satellite system (GNSS)/global positioning system (GPS)) coexist in one terminal, such intra-device interference may occur where transmission under one communication protocol interferes with reception under another communication protocol. To address such intra-device interference, the terminal reports occurrence of intra-device interference to the base station, and the base station takes steps to address the interference based on the report from the terminal, e.g., hand the terminal over to another frequency.

According to an embodiment of the present disclosure, there is described a scheme to address the failure to properly receive positioning-related signals, such as GNSS/GPS, by such intra-device interference.

The reception of GNSS positioning-related signals by the terminal may be interfered by LTE uplink transmission by the terminal. In particular, when two or more LTE signals are simultaneously transmitted, reception of signals with a frequency not adjacent to the LTE uplink frequency may be negatively affected by inter modulation distortion (IMD).

For reference, the terminal receives GNSS positioning signals in various cases as follows.

(1) in case of receiving a GNSS positioning signal to inform the emergency call center of the location of the terminal in association with an emergency call (2) in case of receiving a global navigation satellite system (GNSS) positioning signal for car navigation (3) in case of receiving a positioning signal for Internet positioning services such as Googlemap In the case of receiving a positioning signal related to emergency call by the terminal among the above cases, the reception of the emergency call occurring in emergency is more critical than LTE uplink transmission. In contrast, the reception of positioning signals is critical for the remaining cases, but the LTE uplink transmission may be treated to be more critical under the determination of the base station.

An operation of the terminal to address the inter-device interference according to the present disclosure is as follows.

Figure 15:
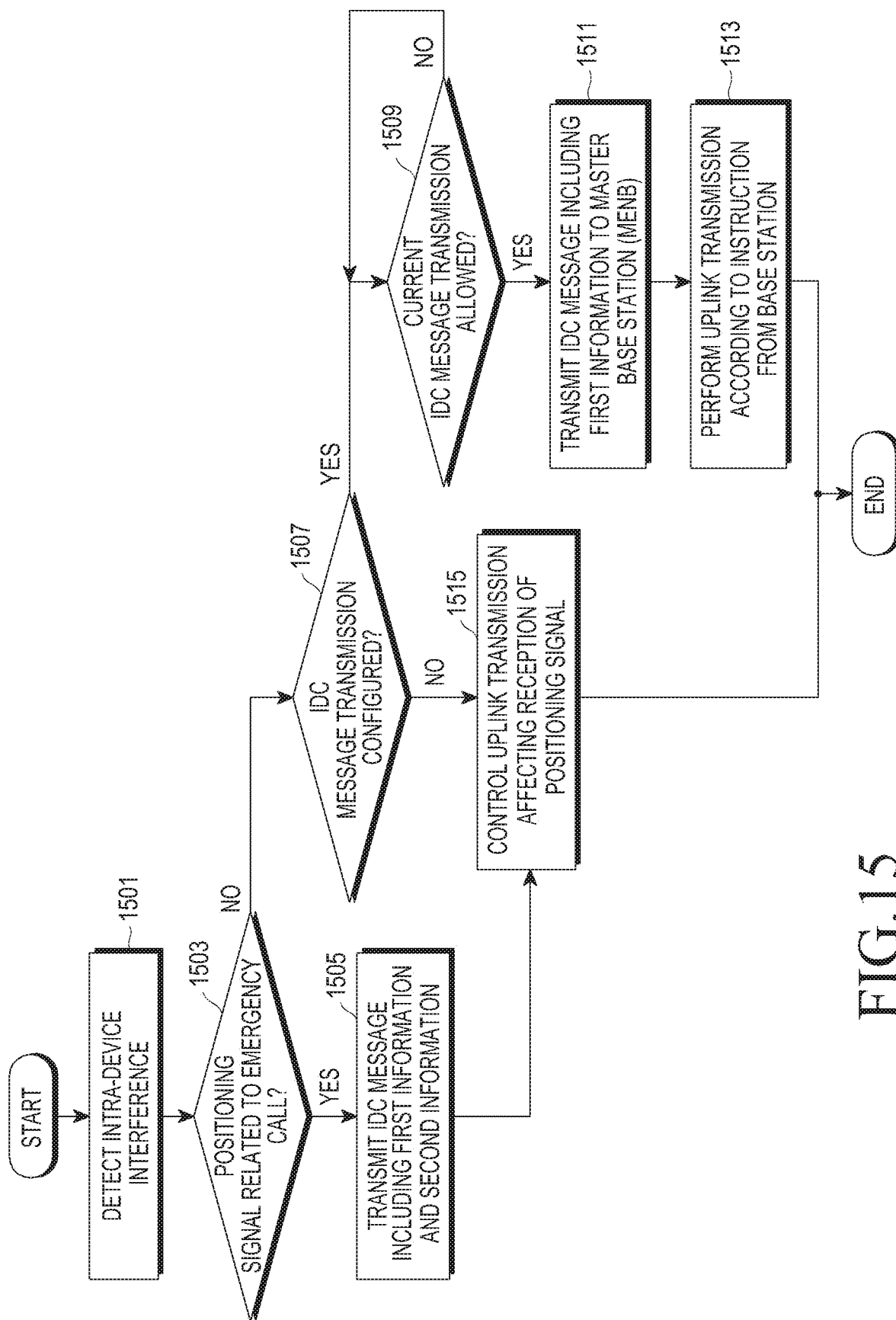
FIG. 15 is a view illustrating an embodiment of the present disclosure.

FIG. 15 is a view illustrating an operation by a terminal according to an embodiment of the present disclosure.

In operation 1501, the terminal detects the occurrence of interference with the reception of a positioning signal such as GPS/GNSS as a plurality of communication protocols coexist in the terminal. LTE uplink transmission is performed through at least one LTE uplink, and whether the currently received positioning signal is interfered by the LTE uplink transmission signal is detected. However, detecting the occurrence of interference in operation 1501 includes not only whether interference has occurred with a positioning signal already received but also when a positioning signal to be received by the terminal is predicted to be encountered with interference.

In operation 1503, the terminal determines whether the positioning signal is related to an emergency call. When the positioning signal is related to the emergency call, it goes to operation 1505, and otherwise, to operation 1507. For reference, the emergency call refers to a call sent to an emergency call center, such as 911, and if the emergency call begins, the terminal automatically runs positioning and transfers its location information to the call center. The radio protocol device of the terminal may fail to exactly determine whether the positioning process currently going on is related to the emergency call. Accordingly, when the emergency call begins, the application layer of the terminal notifies the RRC layer of the same. The RRC layer, upon receiving the report that inter-device interference has occurred from a unit receiving positioning signals (GPS/GNSS), sees whether the emergency call is going on at the corresponding time and determines whether the positioning process or the reception of positioning signal is related to the emergency call.

In operation 1507, the terminal determines whether IDS message transmission has been set up upon establishment of current RRC connection. If the IDC message transmission has been set up, it goes to operation 1509, otherwise to operation 1515. For reference, as per the provider's policy or performance of the base station, even though the intra-device interference issue is reported by the IDC message, it may be selected for the base station not to address such issue. In such case, the IDC message transmission leads to waste of radio transmission resources and power of the terminal, and thus, the base station sets up the transmission of IDC message through an RRC connection reconfiguration message in the RRC connection reconfiguration process. In other words, the terminal transmits the IDC message only when the IDC message transmission is set up through the control message.

In operation 1509, the terminal determines whether the IDC message transmission is currently allowed. When the IDC message transmission is currently allowed, it goes to operation 1511, otherwise waits until the IDC message transmission is allowed. For reference, the current IDC message transmission is allowed in the following cases.

(1) In case intra-coexistence issue (hereinafter, referred to as the "IDC issue") has occurred or goes on at least one LTE frequency, and after the IDC message transmission has been set up, no intra-device coexistence indication message has been transmitted yet.

(2) In case the IDC issue has occurred or goes on at least one LTE frequency, and although an IDC message has been transmitted, the frequency where the IDC issue has occurred is different from the frequency upon previous IDC message transmission.

In operation 1511, the terminal transmits an IDC message including first information to a main base station (MeNB).

The first information includes information indicating that the LTE uplink transmission may interfere with reception of positioning signals (or serve as interference upon reception of the signals) and frequency information regarding the LTE uplink interfering with reception of positioning signals and frequency information on the positioning signals. The LTE uplink frequency information may be an ARFCN specifying the uplink or measured target identifier (measObjectId) information set to the downlink relating to the uplink (or paired or linked therewith). If the reception of positioning signal faces interference when two LTE uplink transmissions are made simultaneously, two information items (ARFCN or measObjectId) to specify the LTE uplink frequency affecting the reception of the positioning signal are included for each.

Since the terminal has reported the IDC issue to the base station in operation 1511, although the IDC issue occurs when the terminal performs uplink transmission as per the instruction by the base station, the base station weighs more on the uplink transmission than on the reception of positioning signal. Accordingly, in operation 1513, the terminal performs uplink transmission as per the instruction from the base station.

Meanwhile, "the IDC message transmission has not been set up in operation 1507" means that the base station has not addressed the IDC issue occurring in the terminal. Accordingly, the terminal performs its self operation to receive the positioning signal in operation 1515. Specifically, the terminal controls the uplink transmission affecting the reception of positioning signal according to predetermined priority. For example, the terminal, if two LTE uplink transmissions interfere with the reception of positioning signal, does not transmit one of the two according to the following rule.

(1) if the reception of positioning signal is interfered by simultaneous transmission of the uplink signal from the PCell and the uplink signal from the SCell, the transmission of the SCell uplink signal is abandoned while the PCell uplink signal is transmitted (2) if the reception of positioning signal is interfered by simultaneous transmission of the uplink signal from the SCell and the uplink signal from the SCell, the transmission of the SCell uplink signal is abandoned while the MCG SCell uplink signal is transmitted (3) if the reception of positioning signal is interfered by simultaneous transmission of the uplink signal from the PCell and the uplink signal from the PSCell, the transmission of the PSCell uplink signal is abandoned while the PCell uplink signal is transmitted Meanwhile, when the positioning signal is related to the emergency call in operation 1503, it goes to operation 1505.

In operation 1505, the terminal, although no intra-device coexistence control message transmission is set up in the corresponding RRC connection, and the corresponding time is not the time that the intra-device coexistence control message is permitted, includes first control information and second control information in an IDC message and transmits the same through the MCG serving cell to the main base station.

The second control information is information indicating that the reception of positioning signal facing interference by LTE uplink transmission is related to an emergency call, and may be, e.g., one-bit information indicating that an emergency call is now going on.

Meanwhile, the terminal may re-transmit the IDC message if a predetermined condition is met. For example, the terminal may re-transmit the IDC message at a predetermined period while the emergency call proceeds. As another example, when indicated for the LTE uplink transmission interfering with the reception of positioning signal after the IDC message has been transmitted, the terminal may immediately re-transmit the intra-device co-existence report control message. That is, when the positioning signal is not related to the emergency call when transmitting the IDC message, the generated IDC message may be transmitted once, and when the positioning signal is related to the emergency call, the generated IDC message may be periodically or a periodically repeatedly transmitted in a predetermined number of times.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving control information and downlink data by a user equipment (UE) in a wireless communication system, the method comprising:
    receiving, from a base station, first configuration information on a cell group configured for the UE among a plurality of cell groups and second configuration information on cross carrier scheduling associated with the cell group, the cell group comprising a scheduling cell and a scheduled cell, wherein the first configuration information includes cell grouping information configured by the base station;
    receiving, from the base station, carrier indicator field (CIF) information corresponding to the scheduled cell on a downlink control channel being monitored on the scheduling cell, based on the first configuration information and the second configuration information;
    receiving through the scheduling cell, from the base station, control information for a physical uplink shared channel (PUSCH) on the scheduled cell indicated by the CIF, wherein the control information for the PUSCH on the scheduled cell includes information associated with uplink control information (UCI); and
    in case that a transmission of only the UCI on the PUSCH without uplink data is triggered by a configuration of bit field in the control information for the PUSCH, transmitting, to the base station, only the UCI without the uplink data on the PUSCH on the scheduled serving cell.

2. The method of claim 1, wherein the scheduled cell is scheduled by the downlink control channel on the scheduling cell included in the same cell group as the scheduled cell among the plurality of cell groups.

3. The method of claim 1, wherein the second configuration information on the cross carrier scheduling comprises an identifier of the scheduling cell in the cell group and a value corresponding to the CIF information.

4. The method of claim 3, wherein the value corresponding to the CIF information is used in the scheduling cell to indicate a grant or an assignment applicable for the scheduled cell.

5. The method of claim 1, further comprising:
    receiving, from the base station, data on a downlink data channel or transmitting data on a uplink data channel of the scheduled cell included in the same cell group as the scheduling cell among the plurality of cell groups, based on the CIF information with a predetermined number of bits,
    wherein the predetermined number of bits are maintained as 3 bits regardless of a number of serving cells.

6. A user equipment (UE) for receiving control information and downlink data in a wireless communication system, the UE comprising:
    a transceiver; and
    a processor coupled with the transceiver and configured to:
        receive, from a base station, first configuration information on a cell group configured for the UE among a plurality of cell groups and second configuration information on cross carrier scheduling associated with the cell group, the cell group comprising a scheduling cell and a scheduled cell, wherein the first configuration information includes cell grouping information configured by the base station,
        receive, from the base station, carrier indicator field (CIF) information corresponding to the scheduled cell on a downlink control channel being monitored on the scheduling cell, based on the first configuration information and the second configuration information,
        receive through the scheduling cell, from the base station, control information for a physical uplink shared channel (PUSCH) on the scheduled cell indicated by the CIF, wherein the control information for the PUSCH on the scheduled cell includes information associated with uplink control information (UCI), and
        in case that a transmission of only the UCI on the PUSCH without uplink data is triggered by a configuration of bit field in the control information for the PUSCH, transmit, to the base station, only the UCI without the uplink data on the PUSCH on the scheduled cell.

7. The UE of claim 6, wherein the scheduled cell is scheduled by the downlink control channel on the scheduling cell included in the same cell group as the scheduled cell among the plurality of cell groups.

8. The UE of claim 6, wherein the second configuration information on the cross carrier scheduling comprises an identifier of the scheduling cell in the cell group and a value corresponding to the CIF information.

9. The UE of claim 8, wherein the value corresponding to the CIF information is used in the scheduling cell to indicate a grant or an assignment applicable for the scheduled cell.

10. The UE of claim 6,
wherein the processor is further configured to receive, from the base station, data on a downlink data channel or transmit data on a uplink data channel of the scheduled cell included in the same cell group as the scheduling cell among the plurality of cell groups, based on the CIF information with a predetermined number of bits, and
wherein the predetermined number of bits are maintained as 3 bits regardless of a number of serving cells.

11. A method for transmitting control information and downlink data by a base station in a wireless communication system, the method comprising:
transmitting, to a user equipment (UE), first configuration information on a cell group configured for the UE among a plurality of cell groups and second configuration information on cross carrier scheduling associated with the cell group, the cell group comprising a scheduling cell and a scheduled cell, wherein the first configuration information includes cell grouping information configured by the base station;
transmitting, to the UE, carrier indicator field (CIF) information corresponding to the scheduled cell on a downlink control channel being monitored on the scheduling cell, based on the first configuration information and the second configuration information;
transmitting, through the scheduling cell, to the UE, control information for a physical uplink shared channel (PUSCH) on the scheduled cell indicated by the CIF, wherein the control information for the PUSCH on the scheduled cell includes information associated with uplink control information (UCI); and
in case that a transmission of only the UCI on the PUSCH without uplink data is triggered by a configuration of bit field in the control information for the PUSCH, receiving, from the UE, only the UCI without the uplink data on the PUSCH on the scheduled serving cell.

12. The method of claim 11, wherein the scheduled cell is scheduled by the downlink control channel on the scheduling cell included in the same cell group as the scheduled cell among the plurality of cell groups.

13. The method of claim 11, wherein the second configuration information on the cross carrier scheduling comprises an identifier of the scheduling cell in the cell group and a value corresponding to the CIF information.

14. The method of claim 13, wherein the value corresponding to the CIF information is used in the scheduling cell to indicate a grant or an assignment applicable for the scheduled cell.

15. The method of claim 11, further comprising:
transmitting, to the UE, data on a downlink data channel or receiving data on a uplink data channel of the scheduled cell included in the same cell group as the scheduling cell among the plurality of cell groups, based on the CIF information with a predetermined number of bits,
wherein the predetermined number of bits are maintained as 3 bits regardless of a number of serving cells.

16. A base station for transmitting control information and downlink data in a wireless communication system, the base station comprising:
a transceiver; and
a processor coupled with the transceiver and configured to:
transmit, to a user equipment (UE), first configuration information on a cell group configured for the UE among a plurality of cell groups and second configuration information on cross carrier scheduling associated with the cell group, the cell group comprising a scheduling cell and a scheduled cell, wherein the first configuration information includes cell grouping information configured by the base station,
transmit, to the UE, carrier indicator field (CIF) information corresponding to the scheduled cell on a downlink control channel being monitored on the scheduling cell, based on the first configuration information and the second configuration information,
transmit, through the scheduling cell, to the UE, control information for a physical uplink shared channel (PUSCH) on the scheduled cell indicated by the CIF, wherein the control information for the PUSCH on the scheduled cell includes information associated with uplink control information (UCI), and
in case that a transmission of only the UCI on the PUSCH without uplink data is triggered by a configuration of bit field in the control information for the PUSCH, receive, from the UE, only the UCI without the uplink data on the PUSCH on the scheduled cell.

17. The base station of claim 16, wherein the scheduled cell is scheduled by the downlink control channel on the scheduling cell included in the same cell group as the scheduled cell among the plurality of cell groups.

18. The base station of claim 16, wherein the second configuration information on the cross carrier scheduling comprises an identifier of the scheduling cell in the cell group and a value corresponding to the CIF information.

19. The base station of claim 18, wherein the value corresponding to the CIF information is used in the scheduling cell to indicate a grant or an assignment applicable for the scheduled cell.

20. The base station of claim 16,
wherein the processor is further configured to transmit, to the UE, data on a downlink data channel or receive data on a uplink data channel of the scheduled cell included in the same cell group as the scheduling cell among the plurality of cell groups, based on the CIF information with a predetermined number of bits, and
wherein the predetermined number of bits are maintained as 3 bits regardless of a number of serving cells.

* * * * *